US012099317B2

(12) United States Patent
Kurosu

(10) Patent No.: US 12,099,317 B2
(45) Date of Patent: Sep. 24, 2024

(54) IMAGE FORMING APPARATUS HAVING A DETACHABLE TRANSFER UNIT INCLUDING TRANSFER BELT AND A SWINGABLE CLEANING UNIT

(71) Applicant: CANON KABUSHIKI KAISHA, Tokyo (JP)

(72) Inventor: Yuki Kurosu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/494,197

(22) Filed: Oct. 25, 2023

(65) Prior Publication Data

US 2024/0053693 A1 Feb. 15, 2024

Related U.S. Application Data

(62) Division of application No. 17/968,178, filed on Oct. 18, 2022, now Pat. No. 11,846,900.

(30) Foreign Application Priority Data

Oct. 20, 2021 (JP) ................................ 2021-172045

(51) Int. Cl.
*G03G 15/16* (2006.01)
*G03G 21/16* (2006.01)

(52) U.S. Cl.
CPC ......... *G03G 15/161* (2013.01); *G03G 21/168* (2013.01); *G03G 15/1615* (2013.01); *G03G 2215/0132* (2013.01); *G03G 2215/1661* (2013.01); *G03G 2221/1642* (2013.01)

(58) Field of Classification Search
CPC .... G03G 15/75; G03G 15/754; G03G 15/161; G03G 15/166; G03G 15/1615; G03G 21/168; G03G 2215/00139; G03G 2215/1623; G03G 2215/1661; G03G 2215/00962; G03G 2221/1642; G03G 2221/1615
USPC ................ 399/121, 302, 308, 162, 312, 313
See application file for complete search history.

(56) References Cited

U.S. PATENT DOCUMENTS

| | | | |
|---|---|---|---|
| 8,116,656 | B2 | 2/2012 | Furuya |
| 2005/0078991 | A1 | 4/2005 | Kimura et al. |
| 2016/0154369 | A1 | 6/2016 | Takase et al. |
| 2018/0253037 | A1 | 9/2018 | Kubota |
| 2018/0284682 | A1 | 10/2018 | Tsukijima et al. |
| 2019/0369530 | A1 | 12/2019 | Kubota et al. |

FOREIGN PATENT DOCUMENTS

| | | | |
|---|---|---|---|
| JP | 2001-075374 | A | 3/2001 |
| JP | 2004-012674 | A | 1/2004 |
| JP | 2009-145623 | A | 7/2009 |
| JP | 2010-026371 | A | 2/2010 |
| JP | 2010-204250 | A | 9/2010 |
| KR | 2008-006977 | A | 1/2008 |

*Primary Examiner* — Robert B Beatty
(74) *Attorney, Agent, or Firm* — Venable LLP

(57) ABSTRACT

An image forming apparatus includes an image forming portion, a belt unit including a cleaning unit and an opposing roller, and a swinging mechanism. The swinging mechanism includes a swingable member which is provided in a position different from a rotation center of the opposing roller while holding the opposing roller and the cleaning unit without changing a relative positional relationship between the opposing roller and the cleaning unit and which is swingable about a swing axis.

11 Claims, 14 Drawing Sheets

(a)

AT THE TIME OF COMPLETION OF MOUNTING (FIRST ATTITUDE)

(b)

DURING MOUNTING & DISMOUNTING (SECOND ATTITUDE)

IMAGE FORMING APPARATUS HAVING A DETACHABLE TRANSFER UNIT INCLUDING TRANSFER BELT AND A SWINGABLE CLEANING UNIT

FIELD OF THE INVENTION AND RELATED ART

The present invention relates to an image forming apparatus, such as a copying machine, a printer, a facsimile machine, or a multi-function machine having a plurality of functions of these machines, using an electrophotographic type or an electrostatic recording type.

Conventionally, as the image forming apparatus using the electrophotographic type, there is an image forming apparatus of a tandem type including four image forming portions for forming images of colors of, for example, yellow (Y), magenta (M), cyan (C), and black (K). Further, as the image forming apparatus of the tandem type, there is an image forming apparatus employing an intermediary transfer type. In the image forming apparatus of the tandem type employing the intermediary transfer type, toner images of the respective colors of Y, M, C, and K formed in the respective image forming portions are primary-transferred onto an intermediary transfer member, and thereafter are secondary-transferred onto a recording material such as paper. As the intermediary transfer member, an intermediary transfer belt having an endless belt shape has been used in many cases. In the following, principally, the image forming apparatus of the tandem type employing the intermediary transfer type including the intermediary transfer belt will be described as an example.

Such an image forming apparatus is provided with a belt cleaning device for removing and collecting, from the intermediary transfer belt, a deposited matter such as toner remaining on the intermediary transfer belt after secondary transfer. As the belt cleaning device, a belt cleaning device which includes a cleaning member contactable to a surface of the intermediary transfer belt and which removes the deposited matter such as the toner from the surface of the rotating intermediary transfer belt has been used in many cases. Further, a mounting and dismounting unit prepared by integrally assembling an intermediary transfer belt unit including the intermediary transfer belt (hereinafter, simply referred to as a "belt unit") and the belt cleaning device into a unit, which is made detachably mountable to an apparatus main assembly of the image forming apparatus for a maintenance operation or the like.

Further, as a constitution capable of swinging the belt cleaning device relative to the belt unit, a constitution in which space saving during mounting and dismounting of the mounting and dismounting unit relative to the apparatus main assembly of the image forming apparatus is intended to be realized has been proposed (Japanese Laid-Open Patent Application No. 2009-145623).

However, when the belt cleaning device is swung relative to the belt unit, a relative attitude between the intermediary transfer belt and the cleaning member changes. As a result, there is a possibility of occurrences of breakage of the cleaning member, leakage of the toner, and the like.

Further, in the case of the constitution capable of swinging the belt cleaning device relative to the belt unit, when a clearance necessary to swing the belt cleaning device is taken into consideration, there is a possibility that a relative positional relationship between the cleaning member and the intermediary transfer belt cannot be appropriately maintained. As a result, there is a possibility of a occurrences of the breakage of the cleaning member, improper cleaning, and the like.

SUMMARY OF THE INVENTION

A principal object of the present invention is to provide an image forming apparatus capable of realizing space saving during mounting and dismounting of a mounting and dismounting unit relative to an apparatus main assembly of the image forming apparatus while suppressing a change in relative positional relationship between a belt and a cleaning member.

This object has been accomplished by the present invention. According to an aspect of the present invention, there is provided an image forming apparatus comprising: an image forming portion configured to form a toner image; a belt unit including a belt onto which the toner image is transferred, wherein the belt unit includes a stretching roller configured to stretch the transfer belt and a main body unit configured to support the stretching roller, and is detachably mountable in a direction substantially perpendicular to a rotational axis direction of the stretching roller, and wherein the belt unit includes a cleaning unit provided with a blade for cleaning the belt in contact with the belt and includes an opposing roller opposing the blade through the belt; and a swinging mechanism configured to support the cleaning unit so as to be swingable about a swing axis substantially parallel to the rotational axis direction relative to the main body unit, wherein the swinging mechanism includes a swingable member which is provided in a position different from a rotation center of the opposing roller while holding the opposing roller and the cleaning unit without changing a relative positional relationship between the opposing roller and the cleaning unit and which is swingable about the swing axis.

Further features of the present invention will become apparent from the following description of exemplary embodiments with reference to the attached drawings.

Figure 3:
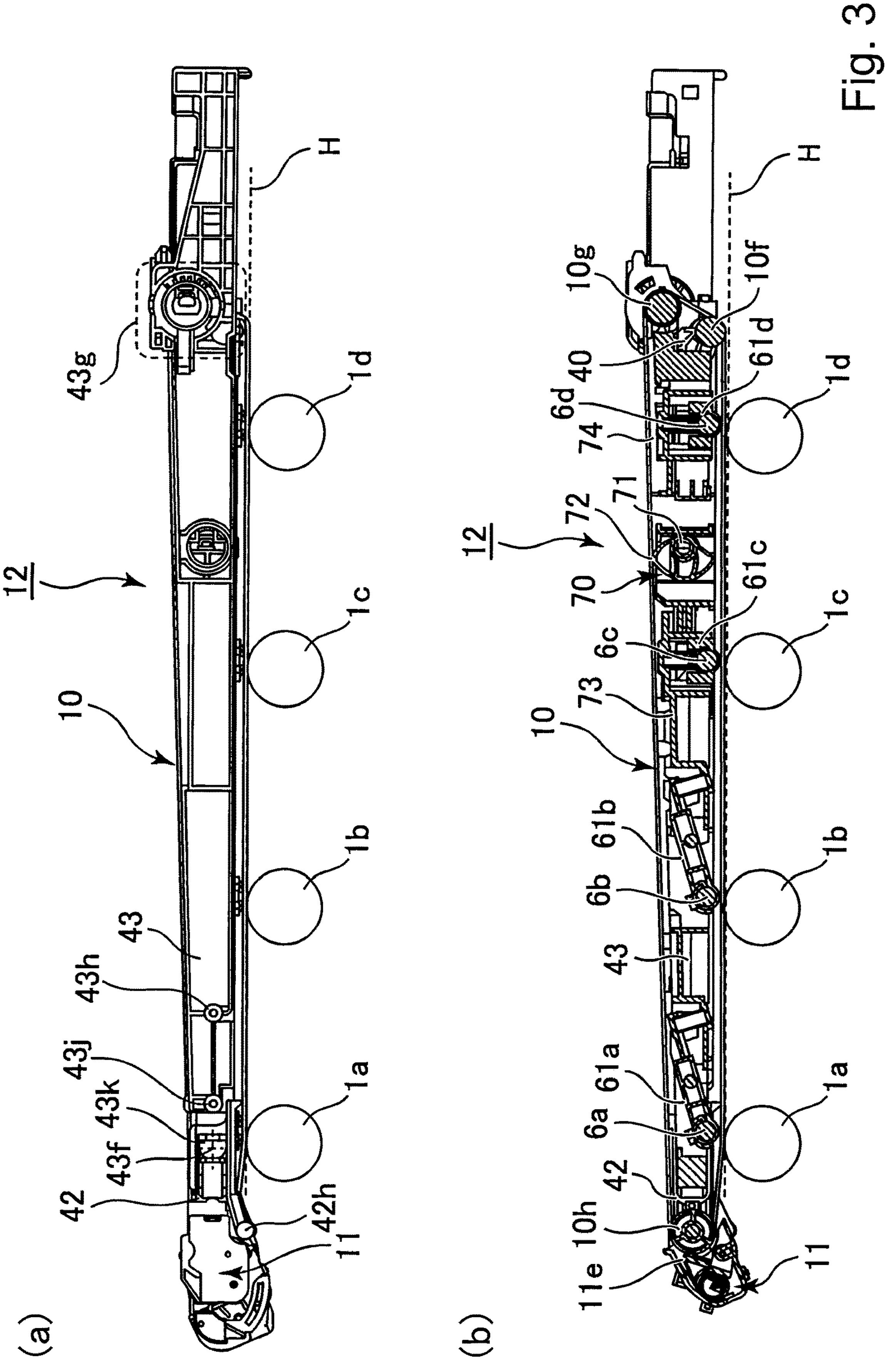

Parts (a) and (b) of FIG. 3 are a side view and a sectional view of the intermediary transfer unit.

Figure 4:
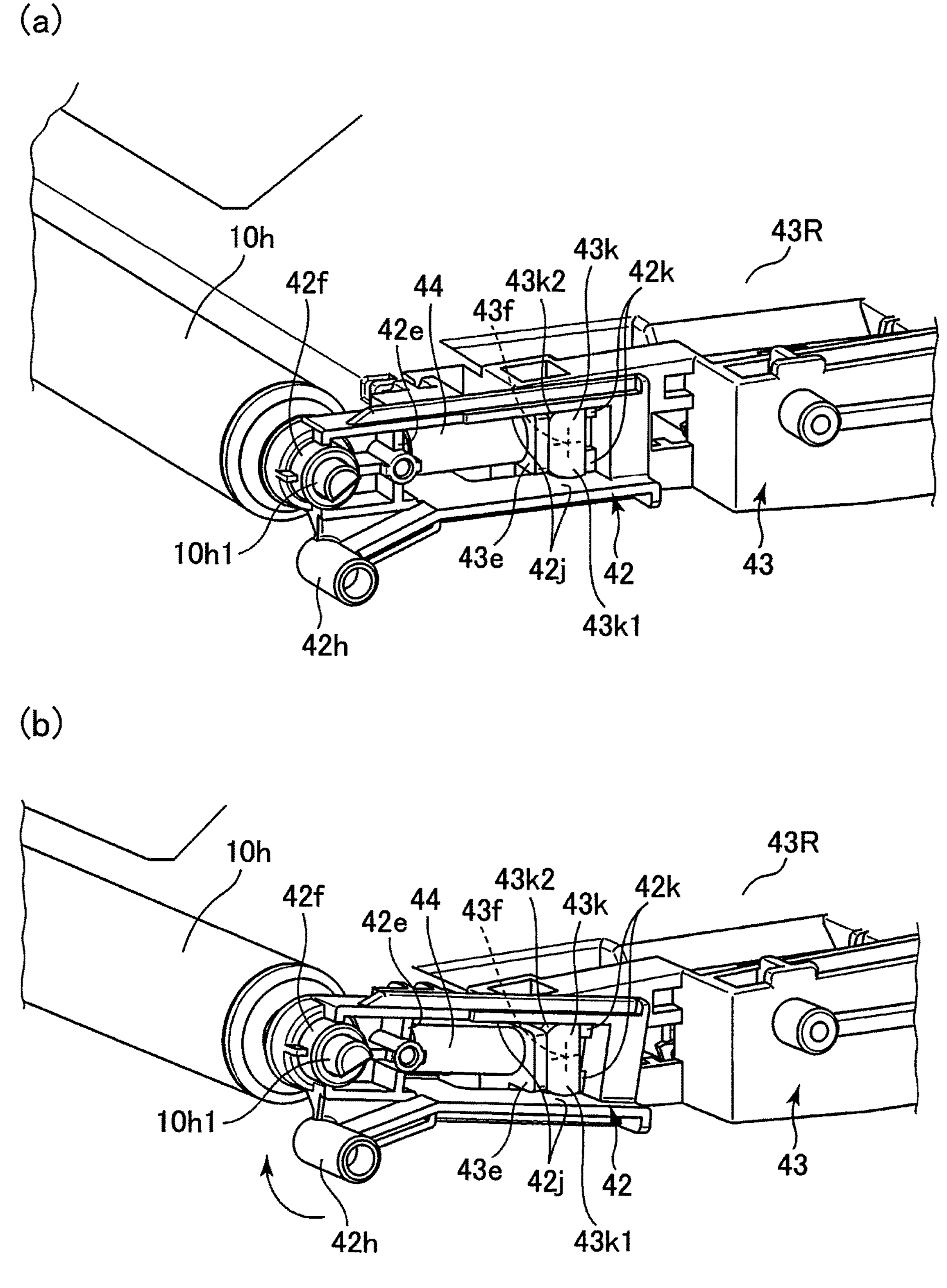

Parts (a) and (b) of FIG. 4 are perspective views each showing a neighborhood of a tension roller bearing member in a belt unit.

Figure 5:
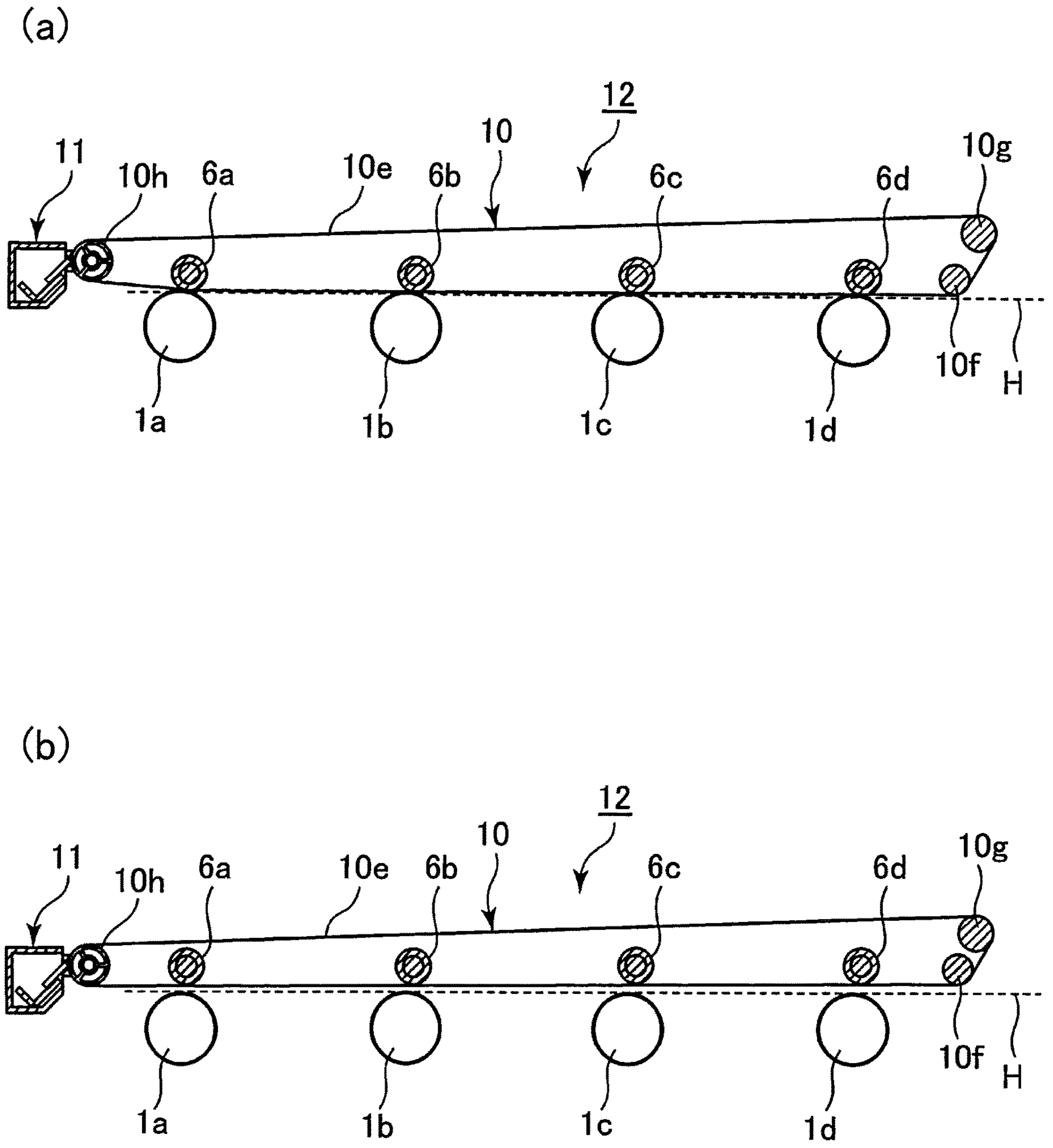

Parts (a) and (b) of FIG. 5 are schematic sectional views for illustrating a contact and separation operation by a primary transfer spacing mechanism.

Figure 6:
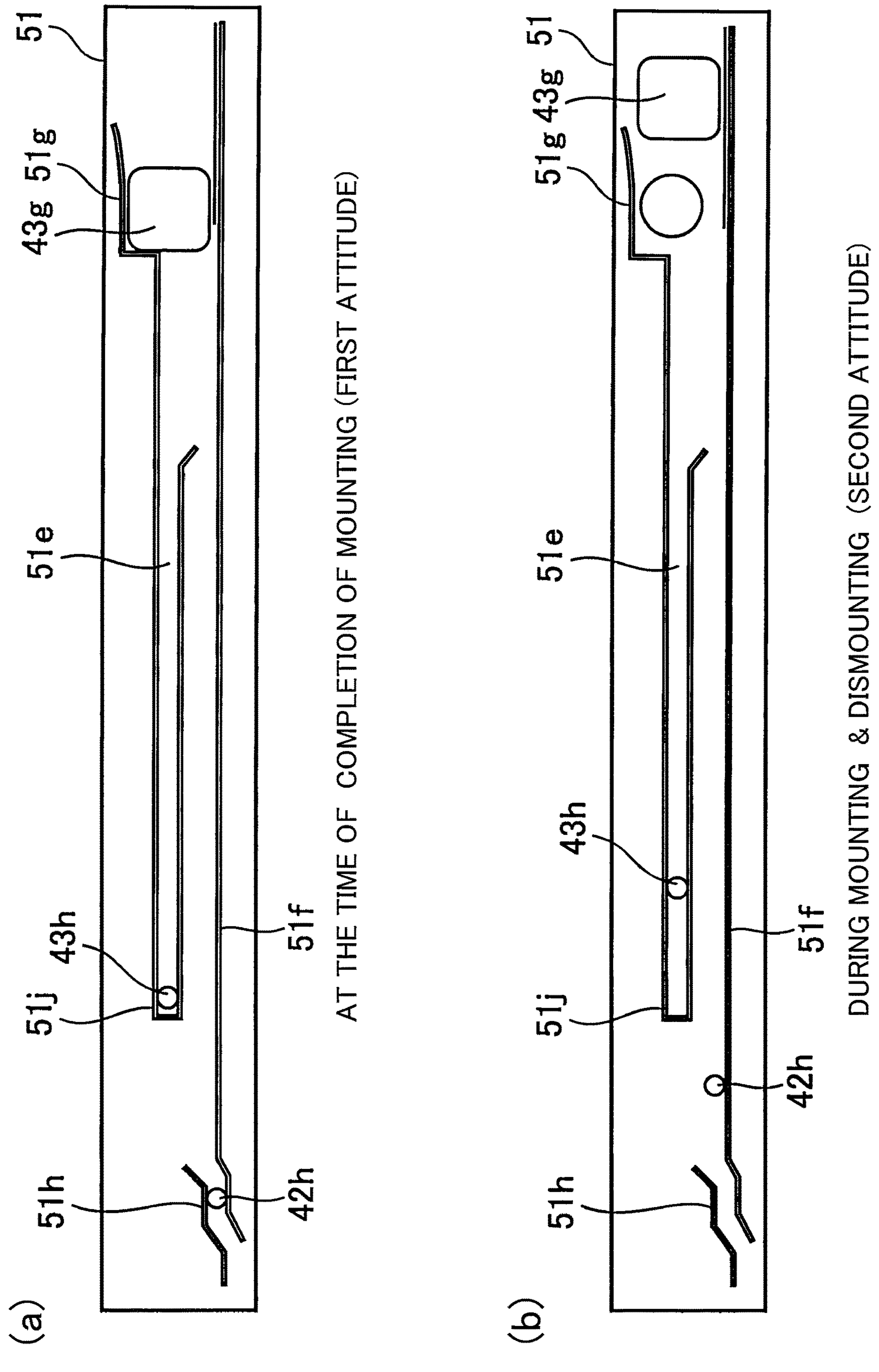

Parts (a) and (b) of FIG. 6 are schematic side views each showing a guiding member.

Figure 7:
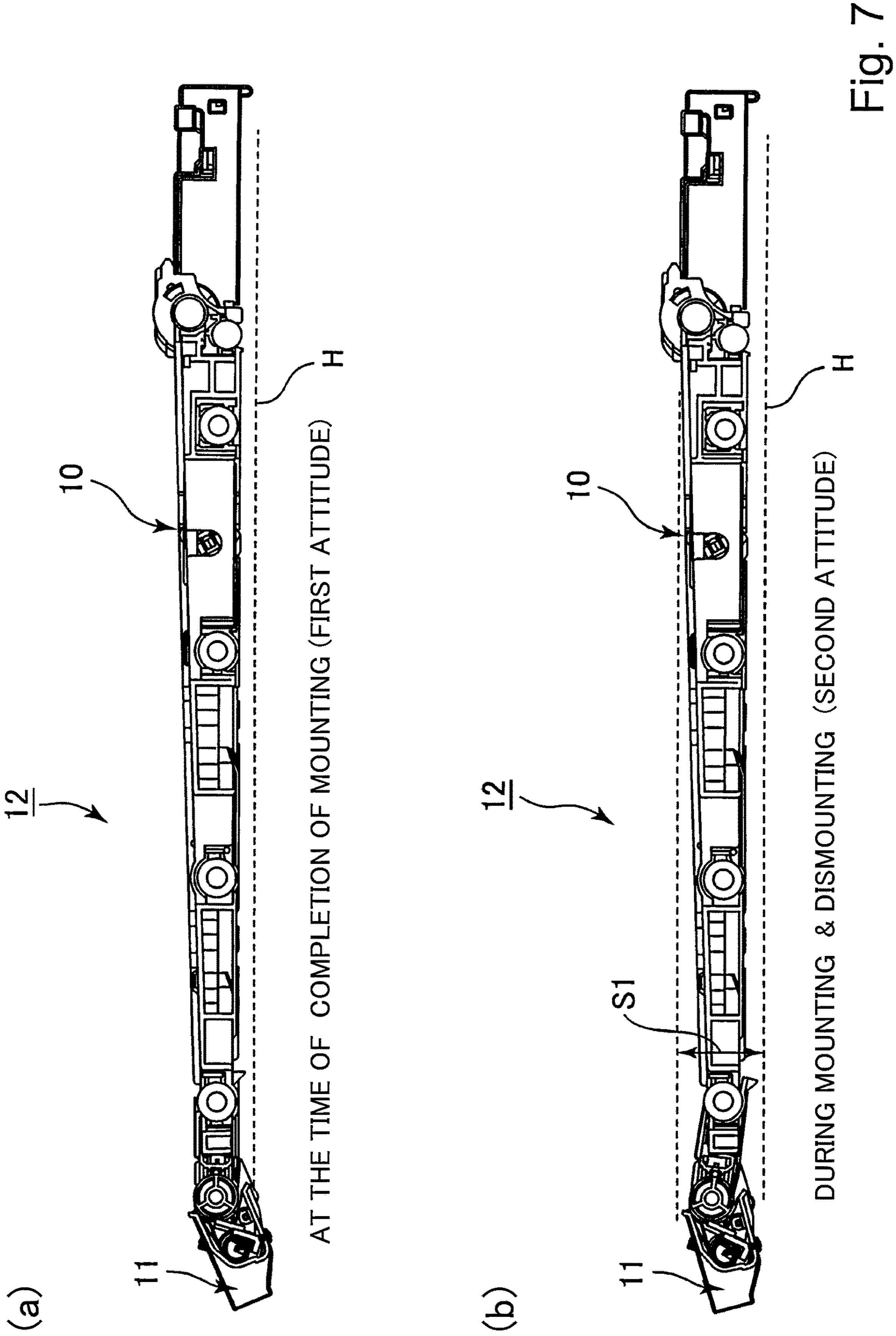

Parts (a) and (b) of FIG. 7 are side views for illustrating attitudes of the intermediary transfer unit in a first embodiment.

Figure 8:
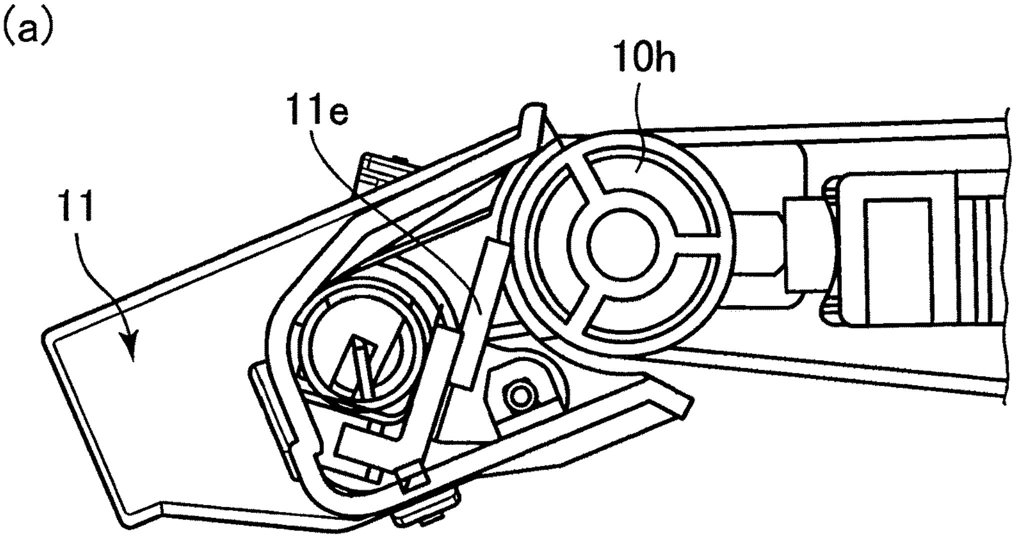
Figure 8:
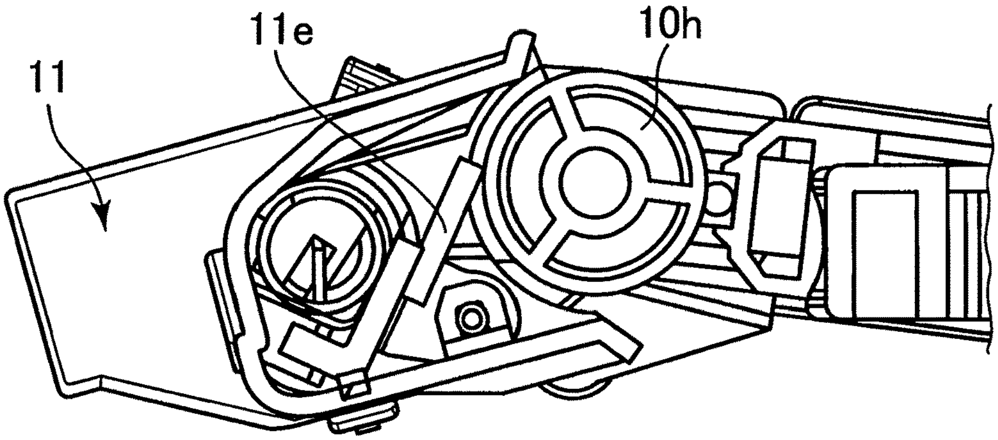

Parts (a) and (b) of FIG. 8 are sectional views for illustrating attitudes of a belt cleaning device in the first embodiment.

Figure 9:
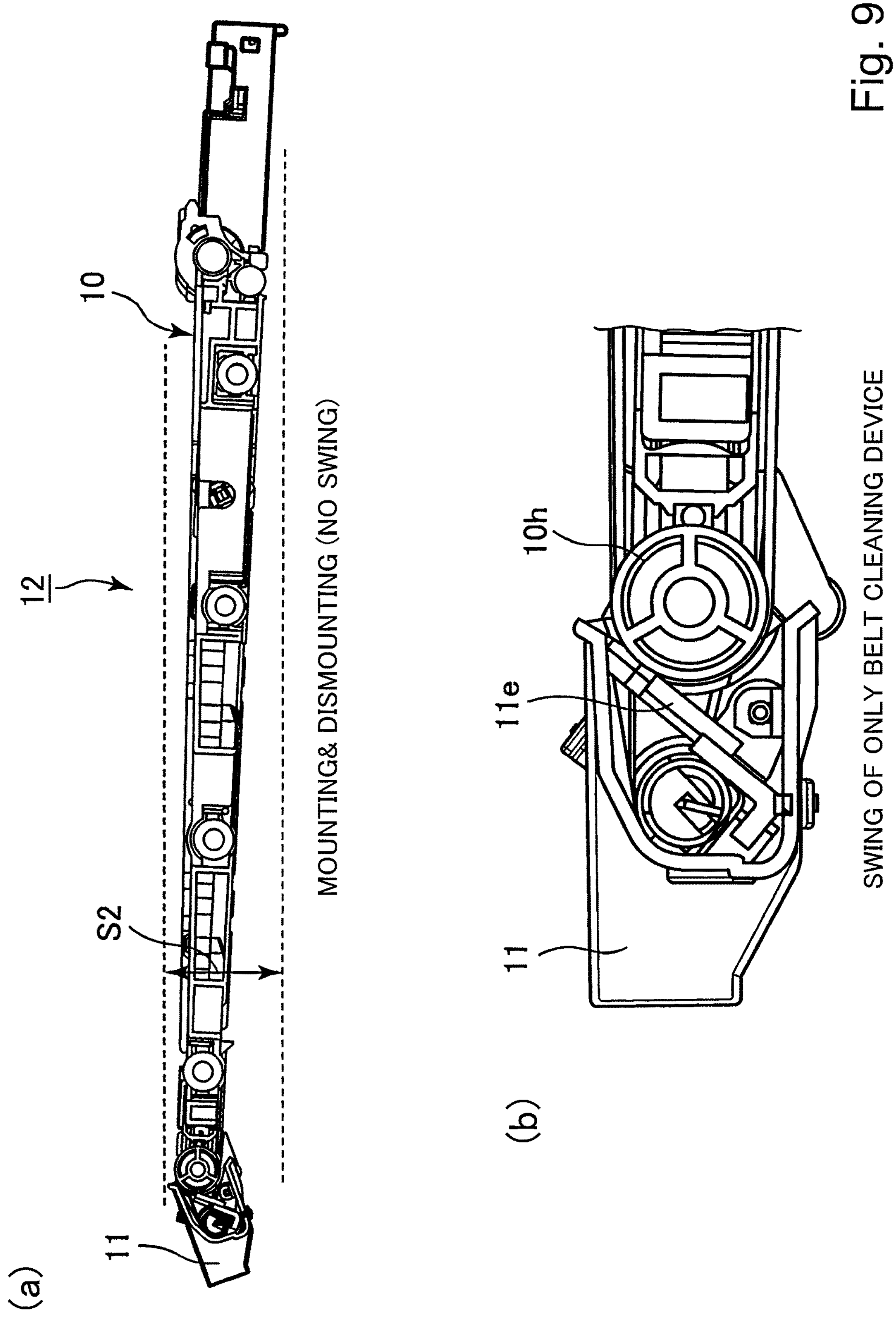

Parts (a) of FIG. 9 is a side view for illustrating an attitude of the intermediary transfer unit in the case where a swinging constitution is not provided, and part (b) of FIG. 9 is a sectional view for illustrating an attitude of the belt cleaning device in the case where only the belt cleaning device is swung.

Figure 10:
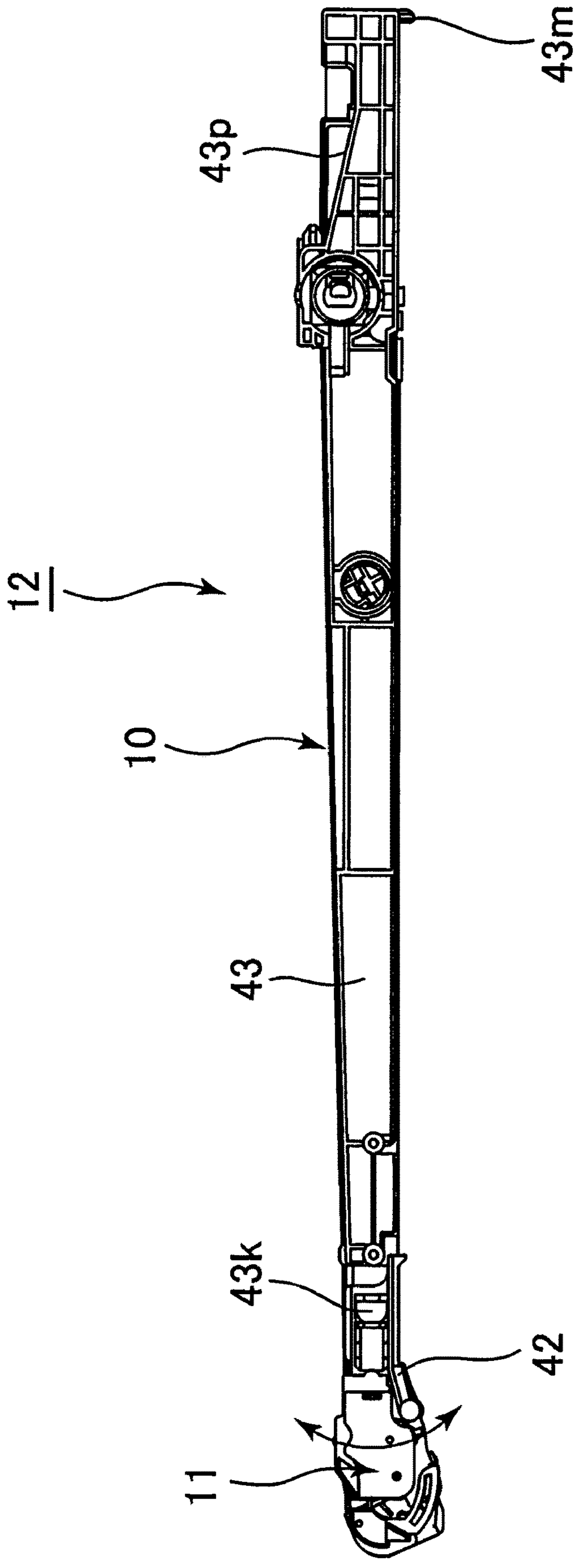

FIG. 10 is a side view for illustrating an attitude of the intermediary transfer unit dismounted from an apparatus main assembly.

Figure 11:
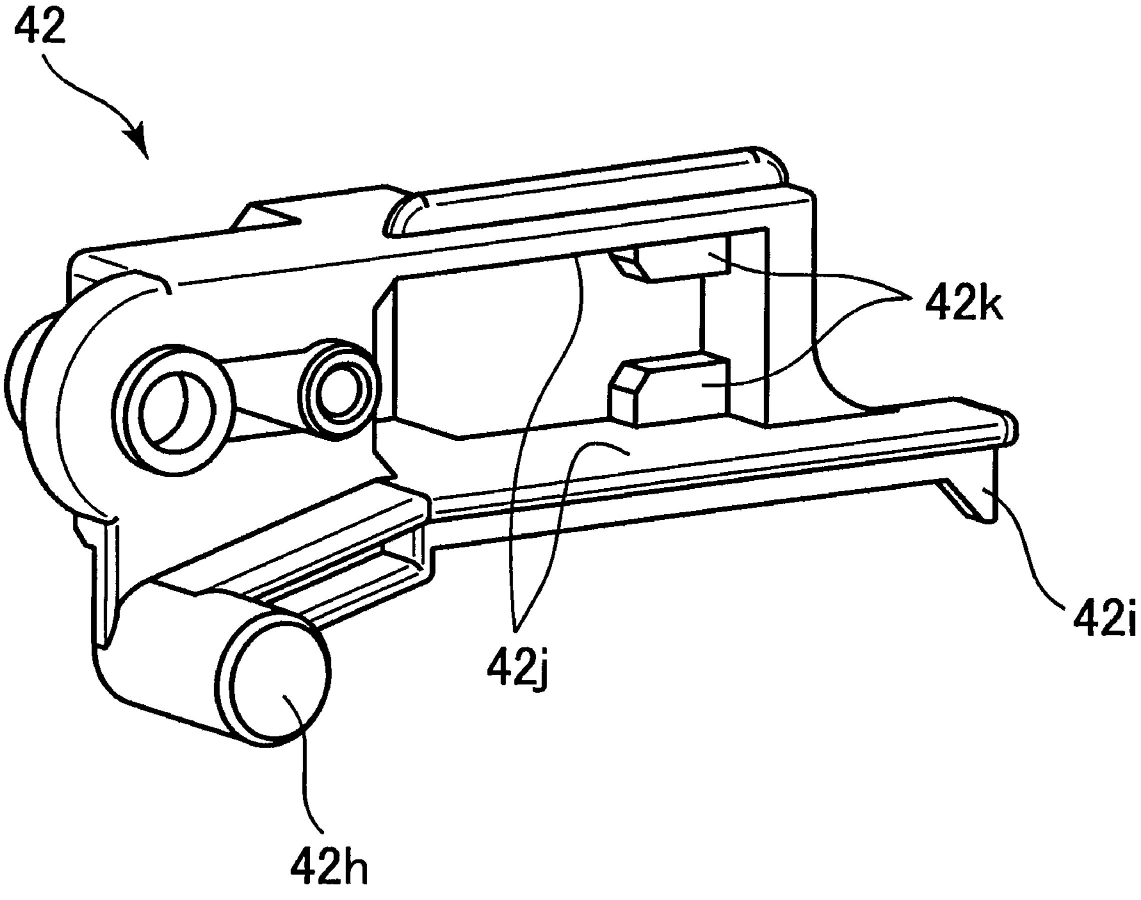

FIG. 11 is a perspective view of a tension roller bearing member in a second embodiment.

Figure 12:
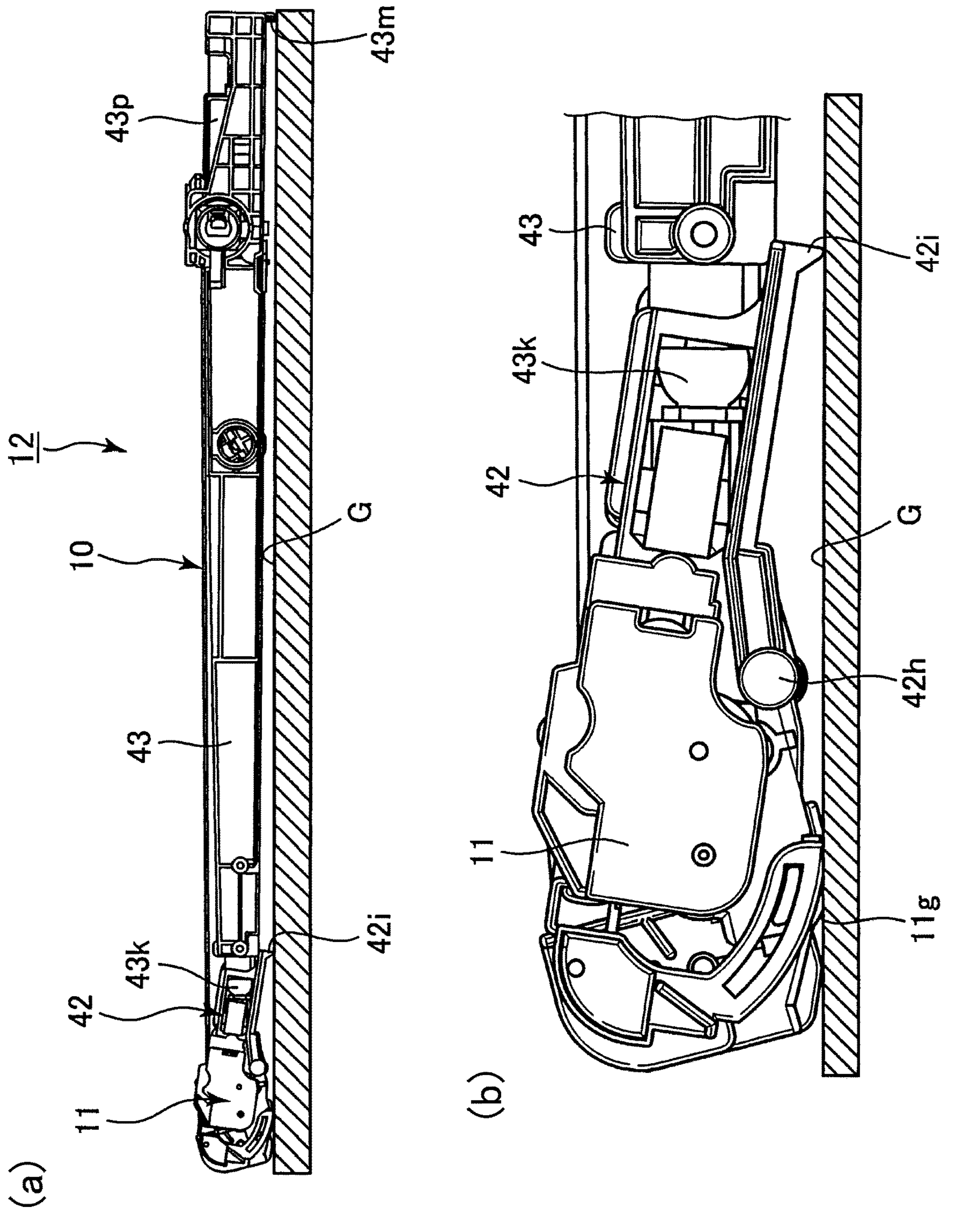

Parts (a) and (b) of FIG. 12 are side views in the case where an intermediary transfer unit is placed on a flat surface.

Figure 13:
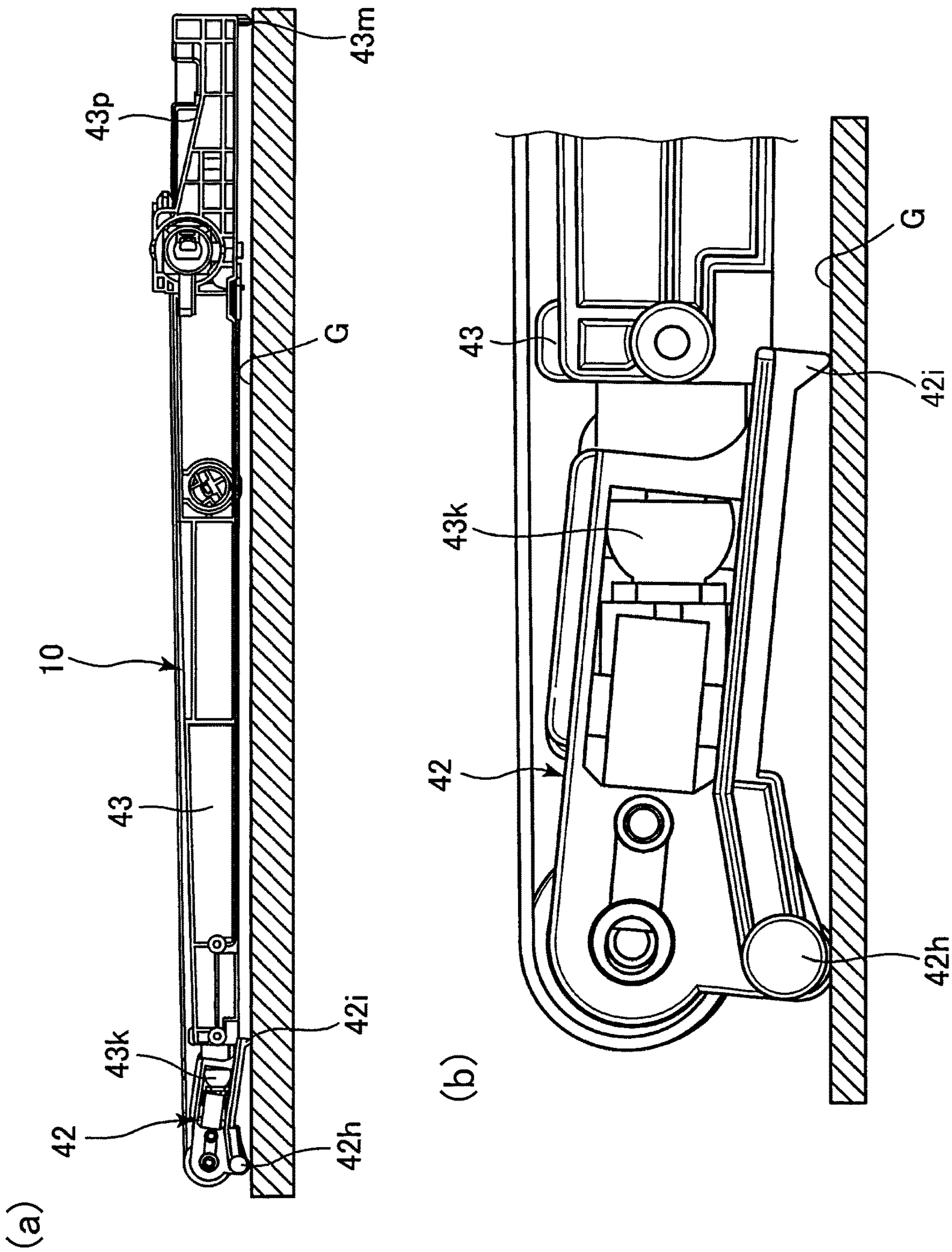

Parts (a) and (b) of FIG. 13 are side views in the case where a belt unit is placed on a flat surface.

Figure 14:
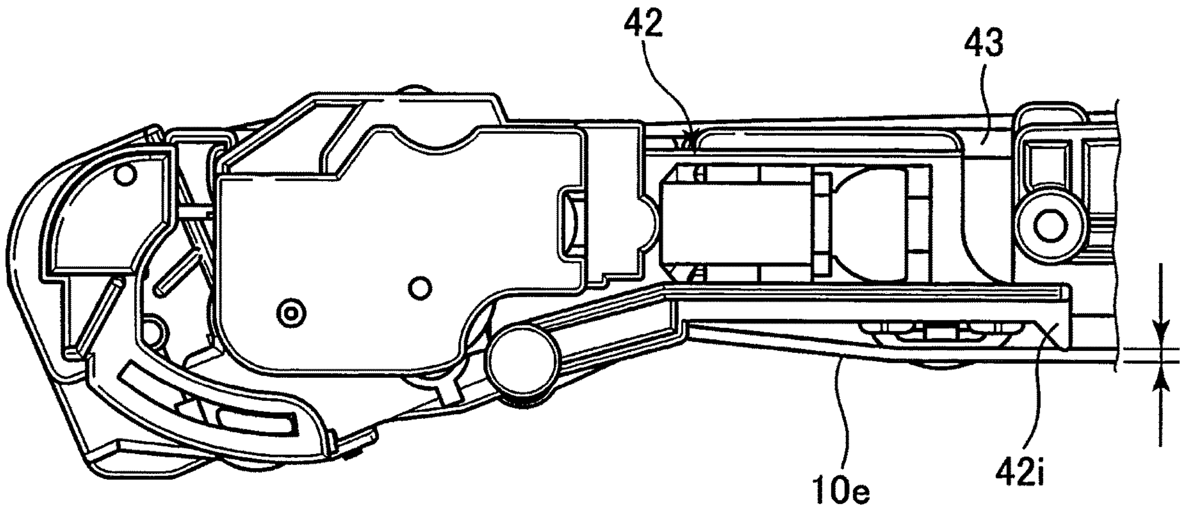

FIG. 14 is a side view showing positions of a bearing foot portion and an intermediary transfer belt.

DESCRIPTION OF THE EMBODIMENTS

In the following, the image forming apparatus according to the present invention will be further described specifically with reference to the drawings.

Embodiment 1

1. General Structure and Operation of Image Forming Apparatus

Figure 1:
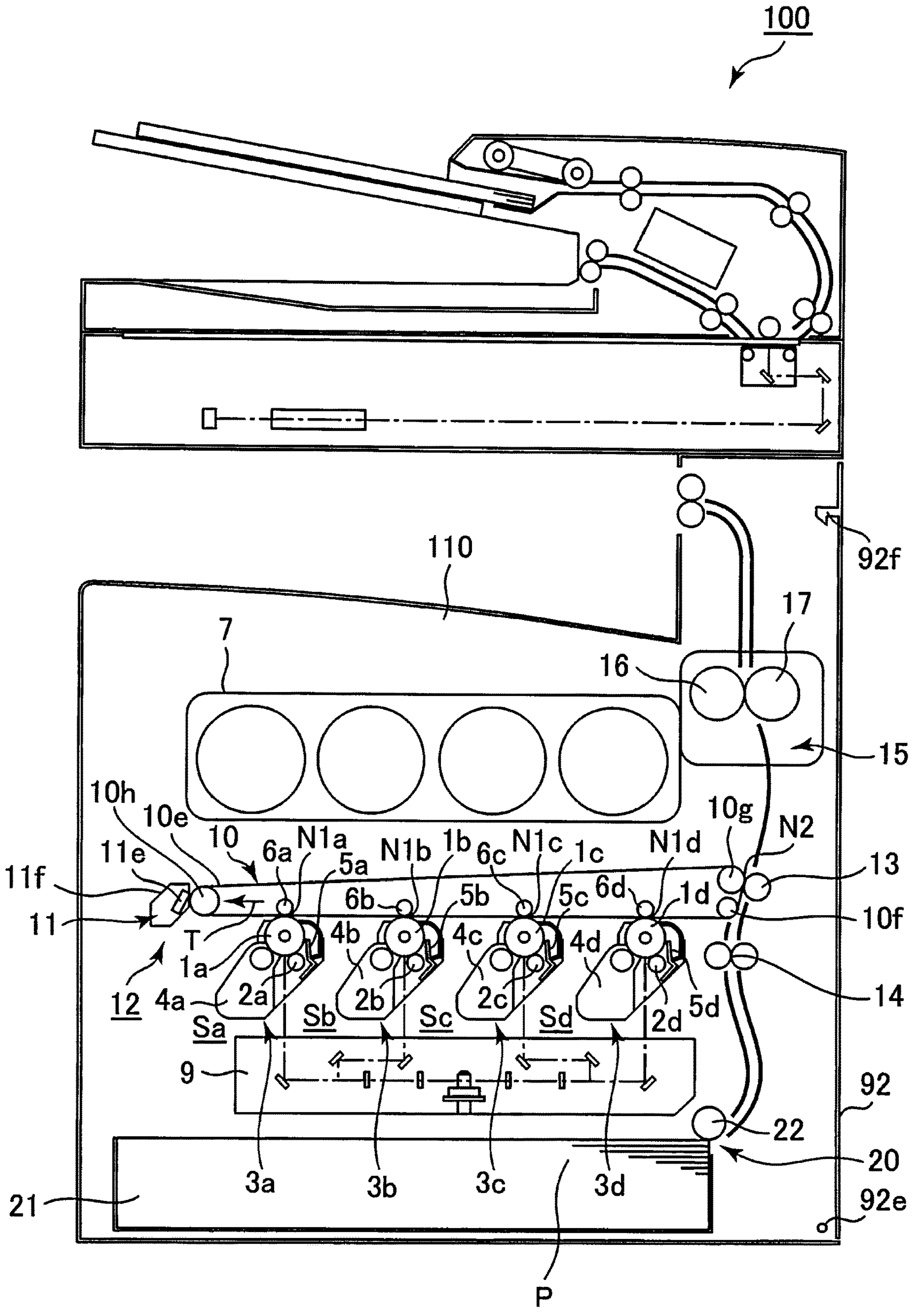
FIG. 1 is a schematic sectional view of an image forming apparatus.

FIG. 1 is a schematic sectional view of an image forming apparatus 100 of an embodiment 1. The image forming apparatus 100 of this embodiment is a multi-function machine (having functions of a copying machine, a printer, and a facsimile machine) of a tandem type employing an intermediary transfer type in which a full-color image is capable of being formed using an electrophotographic type.

The image forming apparatus 100 includes, as a plurality of image forming portions (stations), first, second, third, and fourth image forming portions Sa, Sb, Sc, and Sd for forming images of colors of yellow (Y), magenta (M), cyan (C), and black (K), respectively. In this embodiment, structures and operations of the image forming portions Sa, Sb, Sc, and Sd are substantially the same except that the colors of toners used are different from each other. As regards elements having the same or corresponding functions or structures in the image forming portions Sa, Sb, Sc, and Sd, suffixes a, b, c, and d of symbols representing the elements for associated colors are collectively described by being omitted in some instances.

The image forming portion S includes a photosensitive drum 1 which is a drum-type (cylindrical) electrophotographic photosensitive member as an image bearing member. The photosensitive drum 1 is rotationally driven in the clockwise direction in FIG. 1.

At a periphery of the photosensitive drum 1, the following means and provided. First, a charging roller 2 which is a roller-shaped charging member as a charging means is disposed. Further, an exposure device (laser scanner device) 9 as an exposure means is disposed. In this embodiment, the exposure device 9 is constituted as a single unit for exposing the photosensitive drums 1*a*, 1*b*, 1*c*, and 1*d* to light. Further, a developing device 4 as a developing means is disposed. Further, a primary transfer roller 6 is disposed. Further, a drum cleaning device 5 as a photosensitive member cleaning means is disposed.

In this embodiment, each image forming portion S is constituted by the photosensitive drum 1, the charging roller 2, the exposure device 9, the developing device 4, the primary transfer roller 6, the drum cleaning device 5, and the like. Further, in this embodiment, in each image forming portion S, the photosensitive drum 1, and as process means actable on the photosensitive drum 1, the charging roller 2, the developing device 4, and the drum cleaning device 5 are integrally assembled into a unit, thus constituting a process cartridge 3. This process cartridge 3 is detachably mountable to an apparatus main assembly 110 of the image forming apparatus 100.

Further, an intermediary transfer belt unit ("belt unit") 10 as a belt conveying device is provided opposed to the four photosensitive drums 1. The belt unit 10 includes an intermediary transfer belt 10*e* constituted by an endless belt as an intermediary transfer member. The intermediary transfer belt 10*e* is stretched by, as a plurality of stretching rollers (stretching members), a driving roller 10*g*, a restricting roller 10*f*, and a tension roller 10*h*. The intermediary transfer belt 10*e* is rotated (moved and circulated) in the counterclockwise direction in FIG. 1 by rotationally driving the driving roller 10*g*. The tension roller 10*h* is urged from an inner peripheral surface side toward an outer peripheral surface side of the intermediary transfer belt 10*e* as indicated by an arrow T in FIG. 1, whereby predetermined tension is imparted to the intermediary transfer belt 10*e*. On the inner peripheral surface side of the intermediary transfer belt 10*e*, correspondingly to the photosensitive drums 1*a*, 1*b*, 1*c*, and 1*d*, the primary transfer rollers 6*a*, 6*b*, 6*c*, and 6*d*, respectively, which are roller-shaped primary transfer members as the above-described primary transfer means are disposed. The primary transfer roller 6 is urged (pressed) toward the photosensitive drum 1 at predetermined pressure and is contacted to the photosensitive drum 1 via the intermediary transfer belt 10*e*, so that a primary transfer portion (primary transfer nip) N1 where the intermediary transfer belt 10*e* and the photosensitive drum 1 are in contact with each other is formed. Of a plurality of stretching rollers, the stretching rollers other than the driving roller 10*g* and the primary transfer rollers 6*a* to 6*d* are rotated with rotation of the intermediary transfer belt 10*e*.

Further, on the outer peripheral surface side of the intermediary transfer belt 10*e*, in a position opposing the driving roller 10*g*, a secondary transfer roller 13 which is a roller-shaped secondary transfer member as a secondary transfer means is disposed. The secondary transfer roller 13 is urged (pressed) toward the driving roller 10*g* and is contacted to the driving roller 10*g* via the intermediary transfer belt 10*e*, so that a secondary transfer portion (secondary transfer nip) N2 where the intermediary transfer belt 10*e* and the secondary transfer roller 13 are in contact with each other is formed. Further, on the outer peripheral surface side of the intermediary transfer belt 10*e*, in a position opposing the tension belt 10*h*, a belt cleaning device 11 as an intermediary transfer member cleaning means is provided.

In addition, the image forming apparatus 100 includes a feeding and conveying provided 20 for supplying a recording material P to the secondary transfer portion N2, a fixing device 15 for fixing the toner images to the recording material P, a toner supplying device 7 for supplying (replenishing) the toners to the respective developing devices 4*a* to 4*d*, and the like.

During image formation, a surface of the photosensitive drum 1 rotating in the clockwise direction in FIG. 1 is electrically charged uniformly to a predetermined polarity (negative in this embodiment) and a predetermined potential by the charging roller 2. The charged surface of the photosensitive drum 1 is subjected to scanning exposure to light by the exposure device 9 depending on image information on an associated color component corresponding to the image forming portion S, so that an electrostatic latent image (electrostatic image) depending on the image information is formed on the photosensitive drum 1. The electrostatic latent image formed on the photosensitive drum 1 is developed (visualized) by being supplied with the toner as a developer by the developing device 4, so that a toner image is formed on the photosensitive drum 1. In this embodiment, on an exposure portion (light portion, image portion) on the photosensitive drum 1 where an absolute value of a (surface) potential of the photosensitive drum 1 is lowered after the surface of the photosensitive drum 1 is uniformly charged, the toner charged to the same polarity as a charge polarity (negative in this embodiment) of the photosensitive drum 1 is deposited (reverse development type). In this embodiment, a normal charge polarity of the toner which is a charge polarity of the toner during the development is a negative polarity.

The toner image formed on the photosensitive drum 1 is transferred (primary-transferred) onto the intermediary transfer belt 10*e* rotating in the counterclockwise direction in FIG. 1 by the action of the primary transfer roller 6 in the primary transfer portion N1. During the primary transfer to the primary transfer roller 6, a primary transfer voltage (primary transfer bias) which is a DC voltage of an opposite polarity (positive in this embodiment) to the normal charge polarity of the toner is applied by a primary transfer power source (not shown) as a voltage applying means. For example, during full-color image formation, the toner images of the colors of yellow, magenta, cyan, and black formed on the photosensitive drums 1*a*, 1*b*, 1*c*, and 1*d*, respectively, are successively transferred onto the intermediary transfer belt 10*e* superposedly.

The toner images formed on the intermediary transfer belt 10*e* are transferred (secondary-transferred) onto the recording material P such as a recording sheet fed by being nipped between the intermediary transfer belt 10*e* and the secondary transfer roller 13 by the action of the secondary transfer roller 13 by the action of the secondary transfer roller 13 in the secondary transfer portion N2. During the secondary transfer, to the secondary transfer roller 13, a secondary transfer voltage (secondary transfer bias) which is a DC voltage of the opposite polarity (positive in this embodiment) to the normal charge polarity of the toner is applied from a secondary transfer power source (not shown) as a voltage applying means. For example, during the full-color image formation, multiple toner images formed in a superposed state of the four color toners on the intermediary transfer belt 10*e* are moved to the secondary transfer portion N2 by being conveyed by the intermediary transfer belt 10*e*, and then are collectively transferred onto the recording material P in the secondary transfer portion N2. The recording materials P (transfer materials, recording media, sheets) P are accommodated in a recording material cassette 21 or the like as a recording material accommodating portion. The recording materials P are fed one by one from the recording material cassette 21 by a feeding roller 22 or the like, and then the fed recording material P is conveyed to a registration roller pair 14. Then, the recording material P is conveyed to the secondary transfer portion N2 by being timed to the toner images on the intermediary transfer belt 10*e* by the registration roller pair 14. The feeding and conveying device 20 is constituted by the recording material cassette 21, the feeding roller 22, and the like.

The recording material P on which the toner images are transferred is conveyed to the fixing device 15. The fixing device 15 includes a fixing roller 16 provided with a heat source and a pressing roller 17 press-contacting the fixing roller 16. The fixing device 15 heats and presses the recording material P, carrying unfixed toner images, in a fixing nip between the fixing roller 16 and the pressing roller 17. By this, the fixing device 15 fixes the unfixed toner images on the surface of the recording material P. Thereafter, the recording material P is discharged (outputted) to an outside of the apparatus main assembly 110 of the image forming apparatus 100.

On the other hand, a deposited matter such as the toner (primary transfer residual toner) remaining on the photosensitive drum 1 after the primary transfer is removed and collected from the photosensitive drum 1 by the drum cleaning device 5. The drum cleaning device 5 scrapes off and removes the deposited matter such as the toner from the surface of the rotating photosensitive drum 1 by a cleaning blade as a cleaning member disposed so as to contact the surface of the photosensitive drum 1. The drum cleaning device 5 accommodates, in a cleaning container which is a container (frame) of the drum cleaning device 5, the deposited matter such as the toner removed from the surface of the photosensitive drum 1 by the cleaning blade. Further, the deposited matter such as the toner (secondary transfer residual toner) remaining on the intermediary transfer belt 10*e* after the secondary transfer is removed and collected from the intermediary transfer belt 10*e* by the belt cleaning device 11. The belt cleaning device is scrapes off and removes the deposited matter such as the toner from the surface of the rotating intermediary transfer belt 10*e* by a cleaning blade 11*e* as a cleaning member.

The cleaning blade 11*e* is disposed so as to contact the surface of the intermediary transfer belt 10*e* backed up (supported) by the tension roller 10*h*. The belt cleaning device 11 accommodates, in a cleaning container 11*f* which is a container (frame) of the belt cleaning device 11, the deposited matter such as the toner removed from the surface of the intermediary transfer belt 10*e* by the cleaning blade 11*e*. The deposited matters removed by the drum cleaning device 5 and the belt cleaning device 11 as described above are caused to pass through a collecting toner conveying passage (not shown), and then are conveyed toward and collected by a collecting toner container (not shown).

In this embodiment, an intermediary transfer unit 12 as a mounting and dismounting unit into which the belt unit 10 and the belt cleaning device 11 are integrally assembled is made detachably mountable to the apparatus main assembly 110 of the image forming apparatus 100. The intermediary transfer unit 12 will be further described specifically in the following.

2. Intermediary Transfer Unit

The intermediary transfer unit 12 as the mounting and dismounting unit in this embodiment will be described. Incidentally, as regards the image forming apparatus 100 and elements thereof, a front side on a drawing sheet of FIG. 7 is referred to as a "front side", a rear (back) side on the drawing sheet is referred to as a "rear side", a left(-hand) side as viewed from the front side is referred to as a "left(-hand) side", and a right(-hand) side as viewed from the front side is referred to as a "right(-hand) side". A depth direction connecting the front side and the rear side is substantially parallel to a rotational axis direction of the photosensitive drum 1 and rotational axis directions of the stretching rollers 10*g*, 10*f*, and 10*h* for stretching the intermediary transfer belt 10*e*. Further, an up-down direction refers to an up-down direction with respect to a direction of gravitation (vertical direction), but does not mean only immediately above and immediately below, and includes sides upper and lower than the horizontal surface passing through notable element and position. Further, as regards the image forming portions S and elements thereof, unless otherwise specified, upstream and downstream refer to upstream and downstream with respect to a movement direction of the surface (primary transfer surface) of the intermediary transfer belt 10*e* stretched between the tension roller 10*h* and the restricting roller 10*f*.

In this embodiment, the belt unit 10 is detachably mountable to the apparatus main assembly 110 of the image forming apparatus 100 integrally with the belt cleaning device 11. That is, in this embodiment, the intermediary transfer unit 12 as the mounting and dismounting unit into which the belt unit 10 and the belt cleaning device 11 are integrally assembled is detachably mountable to the apparatus main assembly 110. Incidentally, in the intermediary transfer unit 12, the belt cleaning device 11 may be made detachably mountable to the belt unit 10. The intermediary transfer unit 12 is dismounted from the apparatus main assembly 110 for a maintenance such as inspection, repair, and the like, or exchange and the like of the intermediary transfer belt 10*e* and the belt cleaning device 11, for example.

Figure 2:
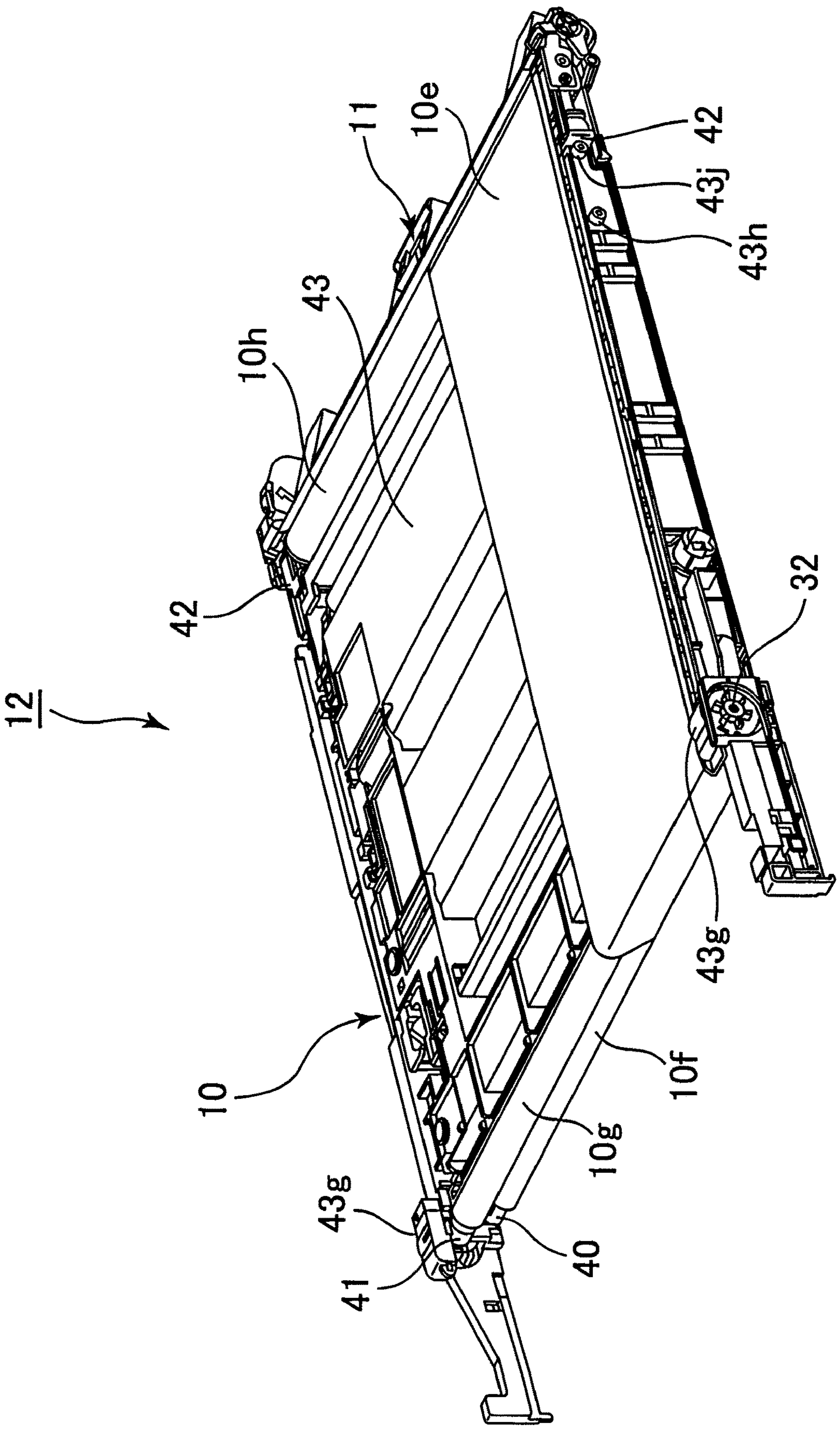
FIG. 2 is a perspective view of an intermediary transfer unit.

FIG. 2 is a perspective view of the intermediary transfer unit 12 (the belt unit 10 and the belt cleaning device 11) in this embodiment as viewed from a right rear side. Part (a) of FIG. 3 is a side view in which the intermediary transfer unit 12 in this embodiment is viewed from the flat surface along the rotational axis direction of the tension roller 10*h*. Part (b) of FIG. 3 is a sectional view (cross section substantially perpendicular to the rotational axis direction of the tension roller 10*h*) of the intermediary transfer unit 12 in this embodiment.

The belt unit 10 includes the intermediary transfer belt 10*e* (in FIG. 2, a part of the intermediary transfer belt 10*e* is shown in cut-away manner). Further, the belt unit 10 includes, as the plurality of stretching rollers around which the intermediary transfer belt 10*e* is wound, the driving roller 10*g*, the restricting roller 10*f*, and the tension roller 10*h*. The driving roller 10*g*, the restricting roller 10*f*, and the tension roller 10*h* are mounted on a frame (main frame) 43 of the belt unit 10.

The driving roller 10*g* is rotatably supported by a driving roller bearing member 41 (in FIG. 2, only the front side thereof is shown) on each of opposite end sides with respect to the rotational axis direction (longitudinal direction) thereof. The driving roller bearing member 41 is mounted on the frame 43. The driving roller 10*g* is rotationally driven by drive transmission thereto from a driving means (not shown) provided in the apparatus main assembly 110 via a drive coupling 32 as a drive transmitting member provided in the belt unit 10. The intermediary transfer belt 10*e* is conveyed by rotationally driving the driving roller 10*g*.

Incidentally, the surface of the driving roller 10*g* is formed by a rubber layer high in friction coefficient for feeding the intermediary transfer belt 10*e* with no slip.

The restricting roller 10*f* is rotatably supported by a restricting roller bearing member 40 (in FIG. 2, only the front side is shown) on each of opposite end sides with respect to the rotational axis direction (longitudinal direction) thereof. This restricting roller bearing member 40 is mounted swingably (rotatably) on the frame 43. The restricting roller 10*f* is rotated with rotation of the intermediary transfer belt 10*e*.

The tension roller 10 is rotatably supported by a tension roller bearing member (hereinafter, simply referred to as a "bearing member") 42 on each of opposite end sides with respect to the rotational axis direction (longitudinal direction) thereof. This bearing member 42 is mounted on the frame 43 so that the intermediary transfer belt 10*e* is movable (slidable) along a direction in which the intermediary transfer belt 10*e* is pressed from the inner peripheral surface side toward the outer peripheral surface side. Further, the bearing member 42 is, as described specifically later, mounted on the frame 43 so as to be swingable about a swing axis (swing center, rotation axis, rotation center) substantially perpendicular to an insertion and extraction direction of the intermediary transfer unit 12 relative to the apparatus main assembly 110. The bearing member 42 on each of the opposite end sides with respect to the rotational axis direction of the tension roller 10*h* is urged by a compression force of tension spring 44 constituted by a compression spring which is an urging member as an urging member.

Further, the bearing member 42 is moved (slid) from the inner peripheral surface side toward the outer peripheral surface side along an urging direction by the tension spring 44. By this, the tension roller 10*h* urges the intermediary transfer belt 10*e* from the inner peripheral surface side toward the outer peripheral surface side as shown by the arrow T in FIG. 1, and thus imparts the tension to the intermediary transfer belt 10*e*.

Further, as shown in part (b) of FIG. 3, the tension roller 10*h* is provided in a position spaced toward a side opposite from the photosensitive drums 1*a* to 1*d* with respect to a common contact flat plane H on a side where the photosensitive drums 1*a* to 1*d* contact the intermediary transfer belt 10*e*. Further, as shown in part (b) of FIG. 3, the tension belt 10*h* is provided in a position adjacent to the most upstream primary transfer roller 6*a*.

Further, the tension roller 10*h* is positioned of a leading side of an insertion direction of the intermediary transfer unit 12 into the apparatus main assembly 110 described specifically later. The tension roller 10*h* is rotated with rotation of the intermediary transfer belt 10*e*.

FIG. 4 is a perspective view showing a neighborhood of the bearing member 42 on the front side of the belt unit 10 in this embodiment. In FIG. 4, the intermediary transfer belt 10*e* is omitted from illustration. Further, in FIG. 4, only the neighborhood of the bearing member 42 is shown, but in this embodiment, a supporting constitution for the tension roller 10*h* is a substantially symmetrical constitution with respect to a substantial center of the intermediary transfer belt 10*e* with respect to a widthwise direction of the intermediary transfer belt 10*e*. Incidentally, the widthwise direction of the intermediary transfer belt 10*e* is a direction (substantially parallel to the rotational axis direction of the tension roller 10*h*) substantially perpendicular to a movement direction (feeding direction) of the surface of the intermediary transfer belt 10*e*. Part (a) of FIG. 4 shows a state of the case where the bearing member 42 is in a position substantially corresponding to a first attitude described later. Further, part (b) of FIG. 4 shows a state of the case where the bearing member 42 is in a position substantially corresponding to a second attitude described later.

The frame 43 is provided with a swing shaft portion 43*k* so as to project outward along the widthwise direction of the intermediary transfer belt 10*e*. Further, the bearing member 42 is provided with a slidable swing engaging portion 42*j* slidably and swingably (rotatably) engaging with the swing shaft portion 43*k*. The swing shaft portion 43*k* includes a head portion 43*k*1 provided with an arcuate surface 43*k*2 slidable with the slidable swing engaging portion 42*j* when the bearing member 42 is swung. Further, the swing shaft portion 43*k* includes a connecting portion (not shown) connecting the head portion 43*k*1 with a main portion 43R of the frame 43 on a back side of the head portion in FIG. 4. The slidable swing engaging portion 42*j* engages with the head portion 43*k*1 of the swing shaft portion 43*k* so as to sandwich the head portion 43*k*1 from above and below in FIG. 4. Further, the bearing member 42 is provided with a retaining portion 42*k* (see, also FIG. 11) for preventing disengagement thereof toward an outside along the widthwise direction of the intermediary transfer belt 10*e* in engagement with a surface of the head portion 43*k*1 of the swing shaft portion 43*k* on the above-described connecting portion side. By this, the bearing member 42 as a first supporting member is swingable, relative to the frame 43 as a second supporting member, about a swing axis 43*f* passing through the swing shaft portion 43*k* on each of the opposite end sides with respect to the widthwise direction of the intermediary transfer belt 10*e* (parts (a) and (b) of FIG. 4). Incidentally, at least one of the bearing member 42 and the frame 43 may be provided with a restricting portion for restricting a moving range of the bearing member 42 toward at least one of above and below in FIG. 4.

The bearing member 42 rotatably supports a rotation shaft 10*h*1 of the tension roller 10*h* at an end portion with respect to the rotational axis direction of the tension roller 10*h*. By this, the tension roller 10*h* is swingable about the above-described swing axis 43*f*. Further, the frame 43 is provided with a frame-side spring receiving portion 43*e* projecting outward along the widthwise direction of the intermediary transfer belt 10*e*. Further, the bearing member 42 is provided with a bearing member-side spring receiving portion 42*e*. Between the frame-side spring receiving portion 43*e* and the bearing member-side spring receiving portion 42*e*, a tension spring 44 is provided in a compressed state. By this, the bearing member 42 is moved (slid) from the inner peripheral surface side toward the outer peripheral surface side of the intermediary transfer belt 10*e* along an urging direction by the tension spring 44, and imparts tension to the intermediary transfer belt 10*e* through the tension roller 10*h*.

Further, the primary transfer rollers 6*a* to 6*d* are rotatably supported by primary transfer bearing members 61*a* to 61*d*, respectively, mounted swingably (rotatably) or linearly movable on the frame 43 on each of opposite end portion sides with respect to the rotational axis direction (longitudinal direction) thereof.

Further, at a position opposing the tension roller 10*h* of the belt unit 10, the belt cleaning device 11 is provided. As described above, the intermediary transfer unit 12 as the mounting and dismounting unit detachably mountable to the apparatus main assembly 110 is constituted by integrally assembly the belt unit 10 and the belt cleaning device 11 through mounting of the belt cleaning device 11 on the belt unit 10. The belt cleaning device 11 is fixed to the bearing member 42. In the belt cleaning device 11, the cleaning blade 11*e* is disposed so as to contact the surface (outer peripheral surface of the intermediary transfer belt 10*e* in a position opposing the tension roller 10*h*. The cleaning blade 11*e* is constituted by a substantially rectangular plate-like elastic member in a plan view in which the elastic member has a predetermined length with respect to each of a longitudinal direction disposed substantially parallel to the widthwise direction of the intermediary transfer belt 10*e* and a short(-side) direction substantially perpendicular to the longitudinal direction and has a predetermined thickness. As an elastic material constituting the cleaning blade 11*e*, an urethane rubber or a silicone rubber is used. Further, as regards the cleaning blade 11*e*, an edge of a free end portion thereof which is one end portion with respect to the short direction is contacted to the surface of the intermediary transfer belt 10*e* backed up (supported) by the tension roller 10*h*, and a fixing end portion which is the other end portion is fixed to a supporting member such as a metal plate. Further, the cleaning blade 11*e* is contacted to the surface of the intermediary transfer belt 10*e* in a counter direction to the movement direction of the surface of the intermediary transfer belt 10*e*.

That is, the cleaning blade 11*e* is disposed so that the free end portion with respect to the short direction is positioned upstream of the fixing end portion with respect to the movement direction of the surface of the intermediary transfer belt 10*e*.

In this embodiment, the cleaning blade 11*e* is constituted so that the cleaning blade 11*e* is in the following attitude during the image formation (during the rotational drive of the intermediary transfer belt) in order that stagnation of the toner, removed from the surface of the intermediary transfer belt 10*e*, on the cleaning blade 11*e*. That is, in the case where the cleaning blade 11*e* is viewed along the rotational axis direction of the tension roller 10*h*, the cleaning blade 11*e* stands so that with respect to the common contact flat plane H, the cleaning blade 11*e* with respect to the short direction has an angle close to right angle (for example, 45° or more and 90° or less). By this, it is possible to suppress the stagnation of the toner on the cleaning blade 11*e*, but a size of the belt cleaning device 11 becomes larger downward in FIG. 3 than the belt unit 10. For that reason, the belt cleaning device 11 has a shape such that the belt cleaning device 11 protrudes downward (toward the photosensitive drum 1 side) in FIG. 3 from the common contact flat plane H.

In this embodiment, the belt cleaning device 11 is positioned relative to the rotation shaft 10*h*1 of the tension roller 10*h* and is fixed to the bearing member 42. Accordingly, the belt cleaning device 11 is swingable, integrally with the bearing member 42 (and the tension roller 10*h*), about the above-described swing axis 43*f*. Incidentally, the belt cleaning device 11 may be detachably mountable to the belt unit 10 of the intermediary transfer unit 12 dismounted from the apparatus main assembly 110.

Here, with reference to FIG. 3 and FIG. 5, a constitution in which the primary transfer roller 6 (the intermediary transfer belt 10*e*) is separated (spaced) from the photosensitive drum 1 will be described. Part (a) of FIG. 5 is a schematic sectional view (cross section substantially perpendicular to the rotational axis direction of the tension roller 10*h*) of the intermediary transfer unit 12 in an all contact state described later. Part (b) of FIG. 5 is a schematic sectional view (cross section substantially perpendicular to the rotational axis direction of the tension roller 10*h*) of the intermediary transfer unit 12. Incidentally, each of parts (a) and (b) of FIG. 3 shows the intermediary transfer unit 12 in the all contact state described later.

In this embodiment, the belt unit 10 is constituted so that the primary transfer rollers 6*a* to 6*d* are separated from the common contact flat plane H when the intermediary transfer unit 12 is mounted (inserted) into and dismounted (extracted) from the apparatus main assembly 110. Further, in this embodiment, the belt unit 10 is constituted so that when the primary transfer rollers 6*a* to 6*d* are separated from the common contact flat plane H, the restricting roller 10*f* is also separated from the common contact flat plane H. By this, it is possible to suppress an occurrence of scars on the intermediary transfer belt 10*e* due to friction or the like of the intermediary transfer belt 10*e* with the photosensitive drums 1 during the mounting and dismounting of the intermediary transfer unit 12 relative to the apparatus main assembly 110.

For this reason, the belt unit 10 is provided with a primary transfer (roller) separating mechanism 70.

As shown in part (b) of FIG. 3, the primary transfer rollers 6*a* to 6*d* are supported by the frame 43 via the primary transfer bearing members 61*a* to 61*d*, respectively, on each of opposite end portion sides with respect to the widthwise direction of the intermediary transfer belt 10*e*. The primary transfer bearing members 61*a* to 61*d* is supported by the frame 43 so as to enable a contact and separation operation of the primary transfer rollers 6*a* to 6*d* relative to the corresponding photosensitive drums 1*a* to 1*d* (common contact flat plane H). Further, the restricting roller 10*f* is supported by the frame 43 via the restricting bearing member 40 (FIG. 2) on each of opposite end portion sides with respect to the widthwise direction of the intermediary transfer belt 10*e*. The restricting roller bearing member 40 is supported by the frame 43 so as to enable a contact and separation operation of the restricting roller 10*f* relative to the photosensitive drum 1*d* (common contact flat plane H) for black. Further, as shown in part (b) of FIG. 3, the frame 43 is provided with a cam rotation shaft 71 which is rotated by inputting drive (driving force) thereto from a driving means (not shown) provided in the apparatus main assembly 110 and which is disposed substantially parallel to the widthwise direction of the intermediary transfer belt 10*e*. On each of the opposite end portion sides of the intermediary transfer belt 10*e* with respect to the widthwise direction, a cam member 72 is fixed to the cam rotation shaft 71, and this cam member 72 is rotated together with the cam rotation shaft 71. On the frame 43, as a movable member, a first cam slider 73 and a second cam slider 74 are mounted so as to be movable in engagement with the cam member 72 on each of the opposite end portion sides of the intermediary transfer belt 10*e* with respect to the widthwise direction. The first slider 73 is moved in a left-right direction in part (b) of FIG. 3 by the cam member 72. By this, the first slider 73 moves the primary transfer bearing members 61*a*, 61*b*, and 61*c* for the colors of yellow, magenta, and cyan. By this, the first slider 73 is capable to move the primary transfer rollers 6*a*, 6*b*, and 6*c* for the colors of yellow, magenta, and cyan toward and away from the corresponding photosensitive drums 1*a*, 1*b*, and 1*c*. Further, the second slider 74 is moved in the left-right direction in part (b) of FIG. 3 by the cam member 72. By this, the second slider 74 moves the primary transfer bearing member 61*d* for black and the restricting roller bearing member 40. By this, the second slider 74 is capable of moving the primary transfer roller 6*d* for black and the restricting roller 10*f* toward and away from the photosensitive drum 1*d* for black. The primary transfer separating mechanism 70 is constituted by the cam rotation shaft 71, the cam member 72, the first slider 73, the second slider 74, and the like.

When the primary transfer rollers 6*a* to 6*d* and the restricting roller 10*f* are separated from the corresponding photosensitive drums 1*a* to 1*d*, the surface (primary transfer surface) of the intermediary transfer belt 10*e* is retracted to a side opposite from the photosensitive drums 1*a* to 1*d* with respect to the common contact flat plane H. By this, as shown in part (b) of FIG. 5, the intermediary transfer belt 10*e* is separated from all the photosensitive drums 1*a* to 1*d*. This state is referred to as the "all separation state". When the primary transfer rollers 6*a* to 6*d* and the restricting roller 10*f* are moved toward the corresponding photosensitive drums 1*a* to 1*d*, the surface of the intermediary transfer belt 10*e* is moved toward the common contact flat plane H. By this, as shown in part (a) of FIG. 5, the intermediary transfer belt 10*e* contacts all the photosensitive drums 1*a* to 1*d*. This state is referred to as the "all contact state". In this embodiment, in the all contact state, the primary transfer roller 6*a* to 6*d* contacts the corresponding photosensitive drums 1*a* to 1*d* via the intermediary transfer belt 10*e*. As regards the primary transfer separating mechanism 70, in order to enable such a contact and separation operation, a cam profile of the cam member 72, shapes of engaging portions of the first and second sliders 73 and 74 with the respective bearing members, and the like are set. Incidentally, the primary transfer separating mechanism 70 may be capable of putting the intermediary transfer belt 10*e* in the all separation state in a stand-by state, a sleep state, a power-off state, and the like of the image forming apparatus 100 and putting only the primary transfer portion Nd for black in the all contact state when the black (single color) image is outputted.

3. Mounting and Dismounting of Intermediary Transfer Unit Relative to Apparatus Main Assembly Next, the mounting and dismounting (insertion and extraction) of the intermediary transfer unit 12 (the belt unit 10 and the belt cleaning device 11) relative to the apparatus main assembly 110 in this embodiment will be described. Incidentally, in this embodiment, a guiding constitution and a positioning constitution which relative to the mounting and dismounting of the intermediary transfer unit 12 relative to the apparatus main assembly 110 are substantially symmetrical constitutions with respect to a substantial center of the intermediary transfer belt 10*e* with respect to the widthwise direction of the intermediary transfer belt 10*e*. Further, in this embodiment, the intermediary transfer unit 12 is inserted from a right side toward a left side of the apparatus main assembly 110 and is mounted in the apparatus main assembly 110, and is pulled out from the left side toward the right surface and is dismounted from the apparatus main assembly 110. Herein, a direction in which the intermediary transfer unit 12 is inserted (mounted) into the apparatus main assembly 110 and extracted or pulled out (dismounted) from the apparatus main assembly 110 along the common contact flat plane H is simply referred to as an "insertion and extraction direction (or mounting and dismounting direction)". This insertion and extraction direction (mounting and dismounting direction) is a direction substantially perpendicular to the rotational axis direction of the tension roller 10*h*. Further, along this insertion and extraction direction, a direction in which the intermediary transfer unit 12 is inserted into the apparatus main assembly 110 is simply referred to as an "insertion direction", and a direction in which the intermediary transfer unit 12 is extracted (pulled out) from the apparatus main assembly 110 is simply referred to as an "extraction (pulling-out) direction". The direction along the common contact flat plane H is typically a direction substantially parallel to the common contact flat plane H, but is not limited thereto, and may also be a direction which is gradually incline upward or downward from the right side toward the left side along the common contact flat plane H.

As shown in FIG. 1, on a right side surface of the apparatus main assembly 110, an openable right(-side) door 92 is provided. The right door 92 is capable of being opened from an upper side in a lower right direction in FIG. 1 about a door rotation shaft 92*e* provided along a rotational axis substantially parallel to the depth direction on a lower side of FIG. 1 by releasing a locking portion 92*f* provided on an upper side in FIG. 1. The secondary transfer roller 13 is mounted on the right door 92. When the right door 92 is opened, an opening enabling access to the intermediary transfer unit 12 is opened. By this, from the right side of the apparatus main assembly 110, the intermediary transfer unit 12 can be mounted and dismounted from the apparatus main assembly 110.

As shown in part (a) of FIG. 3, the intermediary transfer unit 12 is provided with portions-to-be-positioned 43*g*, 43*j*, and 42*h* for positioning the intermediary transfer unit 12 relative to the apparatus main assembly 110. Positioning of the belt unit 10 relative to the apparatus main assembly 110 on the driving roller 10*g* side which is one end portion side of the belt unit 10 with respect to the direction along the insertion and extraction direction of the intermediary transfer unit 12 is performed by a first frame portion-to-be-positioned 43*g* (FIG. 2, part (a) of FIG. 3) provided on the frame 43. The first frame portion-to-be-positioned 43*g* is constituted by an outside surface of a portion supporting the driving roller bearing member 41 of the frame 43. Further, positioning of the belt unit 10 relative to the apparatus main assembly 110 on the tension roller 10*h* side which is the other end portion side of the belt unit 10 with respect to the direction along the insertion and extraction of the intermediary transfer unit 12 is performed by a second portion-to-be-positioned (positioning boss) 43*j* (FIG. 2, part (a) of FIG. 3) provided on the frame 43 and a bearing portion-to-be-positioned 42*h* (part (a) of FIG. 3, FIG. 3) provided on the bearing member 42. The second frame portion-to-be-positioned 43*j* is provided so as to project outward from the side surface of the frame 43 along the widthwise direction of the intermediary transfer belt 10*e*. Incidentally, in this embodiment, a guide boss 43*h* as a portion-to-be-guided having the same constitution as the second frame portion-to-be-positioned 43*j* is provided side by side with the second frame portion-to-be-positioned 43*j*. Further, the bearing portion-to-be-positioned 42*h* is provided so as to project outward from an edge portion of the bearing member 42 on the common contact flat plane H side along the widthwise direction of the intermediary transfer belt 10*e*. Specifically, when the intermediary transfer unit 12 is mounted in the apparatus main assembly 10, positioning of the bearing member 42 relative to the apparatus main assembly 110 and the frame 43 is performed by the bearing member portion-to-be-positioned 42*h*. The portions-to-be-positioned 43*g*, 43*j*, and 42*h* are provided, as described above, on each of the opposite end portion sides of the intermediary transfer belt 10*e* with respect to the widthwise direction. Further, the portions-to-be-positioned 43*g*, 43*j*, and 42*h* also function as portions-to-be-guided guided by a guiding member 51, provided in the apparatus main assembly 110 and described later, during the mounting and dismounting of the intermediary transfer unit 12 relative to the apparatus main assembly 110.

Incidentally, as described above, during an operation of the right-side apparatus main assembly 110, i.e., during the image formation (during rotational drive of the intermediary transfer belt 10*e*), the primary transfer rollers 6*a* to 6*d* and the photosensitive drums 1*a* to 1*d* are in a state (all contact state) in which these members are in contact with each other via the intermediary transfer belt 10*e*. Further, during the mounting and dismounting of the intermediary transfer unit 12 relative to the intermediary transfer unit 12, the primary transfer rollers 6*a* to 6*d* and the restricting roller 10*f* are moved upward by the primary transfer separating mechanism 70 so as to be retracted toward a side opposite from the photosensitive drums 1*a* to 1*d* with respect to the common contact flat plane H. By this, during the mounting and dismounting of the intermediary transfer unit 12 relative to the apparatus main assembly 110, the intermediary transfer belt 10*e* is in a state (all separation state) in which the intermediary transfer belt 10*e* is separated from the photosensitive drums 1*a* to 1*d*.

As shown in FIG. 6, the apparatus main assembly 110 is provided with the guiding member 51 for not only guiding the intermediary transfer unit 12 during the mounting and dismounting of the intermediary transfer unit 12 relative to the apparatus main assembly 110 but also positioning the intermediary transfer unit 12 relative to the apparatus main assembly 110. FIG. 6 includes schematic side views each showing the guiding member 51 in this embodiment as viewed from the front side along the depth direction. In part (a) of FIG. 6, the portions-to-be-positioned 43*g*, 42*j*, and 42*h* provided on the intermediary transfer unit 12 positioned in positions thereof during the image formation (during the rotational drive of the intermediary transfer belt 10*e*) are also illustrated. Further, in part (b) of FIG. 6, the portions-to-be-positioned 43*g*, 43*j*, and 42*h* provided on the intermediary transfer unit 12 positioned in positions thereof during the mounting and dismounting of the intermediary transfer unit 12 are also illustrated. Further, in parts (a) and (b) of FIG. 6, a rear-side guiding member 51 of the guiding members 51 provided on the opposite end portion sides of the intermediary transfer belt 10*e* with respect to the widthwise direction is illustrated. With reference to parts (a) and (b) of FIG. 6, motion of the portions-to-be-positioned 43*g*, 43*j*, and 42*h*, provided on the intermediary transfer unit 12, relative to the guiding member 51 will be described.

The guiding member 51 is provided with, as a positioning portion for determining a position of the intermediary transfer unit 12 relative to the apparatus main assembly 110, a first frame positioning portion 51*g* for determining the above-described first frame portion-to-be-positioned 43*g*. Further, the guiding member 51 is provided with, as the positioning portion, a second frame positioning portion (boss positioning portion) 51*j* for determining a position of the above-described second frame portion-to-be-positioned 43*j*. Further, the guiding member 51 is provided with, as the positioning portion, a bearing positioning portion 51*h* for determining a position of the above-described bearing portion-to-be-positioned 42*h*.

Further, the guiding member 51 is provided with, as a guiding portion for guiding the intermediary transfer unit 12 during the mounting and dismounting of the intermediary transfer unit 12 relative to the apparatus main assembly 110, a first guiding portion (frame guiding portion) 51*e* for guiding the above-described second frame portion-to-be-positioned 43*j* (and the guide boss 43*h*). The first guiding portion 51*e* abuts against the second frame portion-to-be-positioned 43*j* (and the guide boss 43*h*) from above on an upstream side of the insertion direction of the intermediary transfer unit 12, and guides this portion. Further, on a downstream side of the insertion direction of the intermediary transfer unit 12, the first guiding portion 51*e* supports the second frame portion-to-be-positioned 43*j* (and the guide boss 43*h*) from below, and abuts against this portion from above and then guides this portion. Incidentally, the above-described first frame positioning portion 51*g* is positioned (disposed) at an entrance-side (right-side) end portion of the first guiding portion 51*e*. In this embodiment, the first frame portion-to-be-positioned 43*g* is abutted against the first frame positioning portion 51*g*, and the first frame positioning portion 51*g* determines a position of the first frame portion-to-be-positioned 43*g* so as to sandwich the first frame portion-to-be-positioned 43*g* from above and below. Further, the above-described second frame positioning portion 51*j* is positioned (disposed) at a leading-side (left-side)

end portion of the first guiding portion 51*e* with respect to the insertion direction of the intermediary transfer unit 12. In this embodiment, the second frame portion-to-be-positioned 43*j* is abutted against the second frame developing portion 51*j*, and the second frame positioning portion 51*j*, determines a position of the second frame portion-to-be-positioned 43*j* so as to sandwich the second frame portion-to-be-positioned 43*j* from above and below. In this embodiment, the first guiding portion 51*e* extends substantially parallel to the common contact flat plane H (substantially in the horizontal direction in this embodiment).

Further, the guiding member 51 is provided with a second guiding portion (bearing member guiding portion) 51*f* for guiding the above-described bearing portion-to-be-positioned 42*h*. The second guiding portion 51*f* supports the bearing portion-to-be-positioned 42*h* from below and guides this portion. Incidentally, the above-described bearing positioning portion 51*h* is positioned at a leading-side (left-side) end portion of the second guiding portion 51*f* with respect to the insertion direction of the intermediary transfer unit 12 and is disposed so as to be continuous to the second guiding portion 51*f*. In this embodiment, the bearing positioning portion 51*h* determines a position of the bearing portion-to-be-positioned 42*h* so as to sandwich the bearing portion-to-be-positioned 42*h* from above and below. In this embodiment, the second guiding portion 51*h* extends substantially parallel to the common contact flat plane H (in the substantially horizontal direction in this embodiment). Here, there is a need that the second guiding portion 51*f* guides the belt cleaning device 11 so as not to collide with the photosensitive drums 1*a* to 1*d*. For that reason, the position of the bearing portion-to-be-positioned 42*h* guided by the second guiding portion 51*f* is positioned above the position of the bearing portion-to-be-positioned 42*h* positioned by the bearing positioning portion 51*h*. That is, the position of the bearing portion-to-be-positioned 42*h* guided by the second guiding portion 51*f* is positioned on a side opposite with respect to the common contact flat plane H from the position of the bearing portion-to-be-positioned 42*h* positioned by the bearing positioning portion 51*h*.

As shown in part (b) of FIG. 6, when the intermediary transfer unit 12 is mounted in the apparatus main assembly 110 the portions-to-be-positioned 43*g*, 42*j*, and 42*h* of the intermediary transfer unit 12 are in a state in which these portions are positioned by the positioning portions 51*g*, 51*j*, and 51*h* of the guiding member 51. An attitude of the intermediary transfer unit 12 in this state is referred to as a "first attitude". On the other hand, as shown in part (b) of FIG. 6, in a stage during the mounting and dismounting of the intermediary transfer unit 12 relative to the apparatus main assembly 110, specifically, when the bearing portion-to-be-positioned 42*h* is guided by the second guiding portion 51*f*, the intermediary transfer unit 12 is in the following state. That is, the first frame portion-to-be-positioned 43*g* is moved along the common contact flat plane H. Further, the second frame portion-to-be-positioned 43*j* is moved along the common contact flat plane H while being guided by the first guiding portion 51*e*. Further, the bearing portion-to-be-positioned 42*h* is moved along the common contact flat plane H while being guided by the second guiding portion 51*f* in a position above a position in the case where this portion 42*h* is positioned by the bearing positioning portion 51*h*. An attitude of the intermediary transfer unit 12 in this state is referred to as a "second attitude".

Thus, the intermediary transfer unit 12 is constituted such that the bearing member 42 is swingable relative to the frame 43 so that the attitude of the intermediary transfer unit 12 is changed from the first attitude during a start of the insertion to the second attitude different from the first attitude by following the guiding member 51 during the mounting the intermediary transfer unit 12 in the apparatus main assembly 110 while being guided by the guiding member 51. As described above, the bearing member 42 is mounted on the frame 43 so as to be swingable about the swing axis 43*f* passing through the swing axis 43*k* on each of the opposite end portion sides of the intermediary transfer belt 10*e* with respect to the widthwise direction, i.e., about the swing axis 43*f* substantially perpendicular to the insertion and extraction direction of the intermediary transfer unit 12. Further, the belt cleaning device 11 is fixed to the bearing member 42, and is swingable about the swing axis 43*f* integrally with the bearing member 42 (and the tension roller 10*h*).

For example, during the insertion of the intermediary transfer unit 12 into the apparatus main assembly 110, the intermediary transfer unit 12 is inserted into the apparatus main assembly 110 while following the guiding member 51 with the belt cleaning device 11 as a leading portion thereof. When the bearing portion-to-be-positioned 42*h* is mounted on the second guiding portion 51*f*, the intermediary transfer unit 12 is in the second attitude. That is, the intermediary transfer unit 12 is placed in the second attitude in a manner such that the bearing member 42 is swung (rotated) upward (in a direction of moving away from the common contact flat plane H) relative to the frame 43 by self-weights of the frame 43, the primary transfer rollers 6, the primary transfer separating mechanism 70, and the like. A point of this time can be regarded as the time of the start of the insertion of the intermediary transfer unit 12 into the apparatus main assembly 110. Thereafter, the intermediary transfer unit 12 is inserted while being kept in the second state and while the bearing portion-to-be-positioned 42*h* is guided by the second guiding portion 51*f* and the second frame portion-to-be-positioned (and the guide boss 43*h*) are guided by the first guiding portion 51*e*. Thereafter, in this embodiment, the intermediary transfer unit 12 is in the first attitude immediately before the portions-to-be-positioned 43*g*, 43*j*, and 42*h* of the intermediary transfer unit 12 are positioned by the positioning portions 51*g*, 51*j*, and 51*h* of the guiding member 51 (immediately before completion of the mounting). That is, simultaneously with movement (guidance) of the bearing portion-to-be-positioned 42*h* from the second guiding portion 51*f* to the bearing positioning portion 51*h*, the bearing member 42 is swung (rotated) downward (in the direction of moving toward the common contact flat plane H) relative to the frame 43 by self-weights of the bearing member 42, the tension roller 10*h*, the belt cleaning device 11, and the like, so that the intermediary transfer unit 12 is placed in the first attitude. Then, the portions-to-be-positioned 43*g*, 42*j*, and 42*h* of the intermediary transfer unit 12 are positioned by the positioning portions 51*g*, 51*j*, and 51*h* of the guiding member 51, whereby the mounting of the intermediary transfer unit 12 in the apparatus main assembly 110 is completed. During the extraction (pulling-out) of the intermediary transfer unit 12 from the apparatus main assembly 110, an operation is reversed to the above-described operation during the insertion of the intermediary transfer unit 12 into the apparatus main assembly 110. That is, in this embodiment, the intermediary transfer unit 12 is in the second attitude immediately after the extraction thereof from the positioning position is started. As in this embodiment, it is preferable from the viewpoint of space saving described later that the attitude of the intermediary transfer unit 102 is changed from the second attitude to the first attitude immediately before the intermediary transfer unit 12 is positioned in the apparatus main assembly 110. However, the present invention is not limited to such a constitution, but the bearing member 42 may be gradually swung (rotated) with the insertion and extraction operation of the intermediary transfer unit 12. It is only required that the belt cleaning device 11 can be retracted so as not to collide with a member of the image forming portion S, such as a most upstream (most leading-side with respect to the insertion direction of the intermediary transfer unit 12) photosensitive drum 1 (or the process cartridge 3) or the like.

FIG. 7 includes side views each showing a shape in the above-described first attitude or second attitude of the intermediary transfer unit 12 in this embodiment as viewed from the front side along the rotational axis direction of the tension roller 10*h*, in which part (a) of FIG. 7 shows the shape in the first attitude, and part (b) of FIG. 7 shows the shape in the second attitude.

In this embodiment, in a state of the first attitude, the intermediary transfer unit 12 has the shape such that the belt cleaning device 11 protrudes downward from the common contact flat plane H (part (a) of FIG. 7). For that reason, when the intermediary transfer unit 12 is moved along the common contact flat plane H while being kept in this state during the mounting and dismounting of the intermediary transfer unit 12 relative to the apparatus main assembly 110, the belt cleaning device 11 collides with the member of the image forming portion S such as the photosensitive drum 1 (or the process cartridge 3). However, in this embodiment, when the bearing member 42 is swung by the second guiding portion 51*f* of the guiding member 51 through the bearing portion-to-be-positioned 42*h*, the intermediary transfer unit 12 is in the second attitude (part (b) of FIG. 7). The belt cleaning device 11 is fixed to the bearing member 42, and therefore, is swung integrally with the bearing member 42. Further, in the state of the second attitude, the intermediary transfer unit 12 has a shape such that the belt cleaning device 11 is retracted upward from the common contact flat plane H (part (b) of FIG. 7).

As shown in part (b) of FIG. 7, a width (dimension) of a region which is necessary to perform the mounting and dismounting of the intermediary transfer unit 12, placed in the second attitude, relative to the intermediary transfer unit 12 in this embodiment and which ranges in the direction substantially perpendicular to the common contact flat plane H (hereinafter, also referred to as a "necessary region") is referred to as S1. A space in the apparatus main assembly 110 in which the intermediary transfer unit 12 is mounted is defined by the photosensitive drums 1*a* to 1*d* and the toner supplying devices 7*a* to 7*d*, for example. For that reason, a distance between the common contact flat plane H and a line connecting a top (position remotest from the common contact flat plane H) of the belt unit 10 in the neighborhood of a most downstream primary transfer roller 6*d* and a top of the belt cleaning device 11 is the width S1 of the necessary region.

On the other hand, part (a) of FIG. 9 is a side view of the case where it is assumed that the belt cleaning device 11 is inclined so as to be retracted from the common contact flat plane H while keeping the intermediary transfer unit 12 in the above-described first attitude and then the intermediary transfer unit 12 is mounted in and dismounted from the apparatus main assembly 110. As shown in part (a) of FIG. 9, in the case where entirety of the intermediary transfer unit 12 is retracted from the common contact flat plane H without swinging the bearing member 42, the width of the necessary region during the mounting and dismounting of the intermediary transfer unit 12 relative to the apparatus main assembly 110 is S2 (S1<S2). Thus, the constitution in this embodiment in which the bearing member 42 is swung is effective in space saving of a region in the apparatus main assembly 110 in which the intermediary transfer unit 12 is mounted and from which the intermediary transfer unit 12 is dismounted.

Here, it is desirable that the swing axis 43*f* for swinging the bearing member 42 is in a position sufficiently spaced from the rotational axis (center of the rotation shaft 10*h*1) of the tension roller 10*h*. When the swing axis 43*f* is positioned in the neighborhood of the tension roller 10*h*, a swing angle when the bearing member 42 is swung becomes large. For that reason, an amount of movement of the belt cleaning device 11 relative to the intermediary transfer belt 10*e* becomes large. Further, when the swing axis 43*f* is positioned in the neighborhood of the tension roller 10*h*, in the case where the intermediary transfer unit 12 is viewed from a side surface thereof along the rotational axis direction of the tension roller 10*h*, the frame 43 and the tension roller 10*h* overlap with each other. When a constitution in which the bearing member 42 is made swingable by disposing the swing axis 43*f* in such a position is employed, there is a need that the intermediary transfer unit 12 is made large in size with respect to a direction along the widthwise direction of the intermediary transfer belt 10*e*. For that reason, there is a possibility that space saving is hindered. For example, when the intermediary transfer unit 12 in the first attitude is viewed along the rotational axis direction of the tension roller 10*h*, it is desirable that the swing axis 43*f* is in a position spaced from the rotational axis of the tension 10*h* by a distance not less than a diameter of the tension roller 10*h* along the common contact flat plane H. In this embodiment, when the intermediary transfer unit 12 in the first attitude is viewed along the rotational axis direction of the tension roller 10*h*, the swing axis 43*f* is in a position spaced from the rotational axis of the tension roller 10*h* by about 30 μm along the common contact flat plane H. By this, in this embodiment, when the intermediary transfer unit 12 in the first attitude is viewed along the rotational axis direction of the tension roller 10*h*, the swing axis 43*f* is positioned between the position of the rotational axis of the tension roller 10*h* and a position of the rotational axis of the mostupstream photosensitive drum 1*a*.

FIG. 8 includes schematic sectional views (cross-section substantially perpendicular to the rotational axis direction of the tension roller 10*h*) each of a neighborhood of the belt cleaning device 11 when the intermediary transfer unit 12 is in the first attitude or the second attitude in this embodiment. Part (a) of FIG. 8 shows the case of the first attitude, and part (b) of FIG. 8 shows the case of the second attitude. In this embodiment, the belt cleaning device 11 is fixed to the swingable bearing member 42. In this case, even when the belt cleaning device 11 is moved from a position where the intermediary transfer unit 12 is in the first attitude to a position where the intermediary transfer unit 12 is in the second attitude, there is substantially no influence on a positional relationship between the cleaning blade 11*e* and the tension roller 10*h*.

On the other hand, part (b) of FIG. 9 is a sectional view when the belt cleaning device 11 is swung so as to be retracted from the common contact flat plane H in a constitution in which the belt cleaning device 11 is swung about the rotational axis of the tension roller 10*h*. In the case of the constitution in which only the belt cleaning device 11 is swung in such a manner, the cleaning blade 11*e* is rotated relative to the tension roller 10*h*. By this, there is a possibility of occurrences of breakage of the cleaning blade 11*e* and leakage of the toner. Further, the belt cleaning device 11 is swingably mounted and thus backlash is caused between the tension roller 10*h* and the belt cleaning device 11, and therefore, a positional relationship between the intermediary transfer belt 10*e* and the cleaning blade 11*e* is not stabilized, so that there is a possibility that the breakage of the cleaning blade 11*e*, improper cleaning, and the like occur. According to this embodiment, the occurrences of such conveniences can be suppressed.

Thus, in this embodiment, the image forming apparatus 100 includes the belt unit 10 which includes a plurality of rollers including a first roller 10*h* and a second roller 10*g*, an endless belt 10*e* stretched by the plurality of rollers, a first supporting member 42 for supporting the first roller 10*h*, and a second supporting member 43 for supporting the second roller 10*g*. Further, the image forming apparatus 100 includes the belt cleaning device 11 which includes the cleaning member 11*e* for removing the toner from the belt 10*e* in contact with the belt 10*e* in a position opposing the first roller 10*h* and which is mounted on the belt unit 10. Further, the image forming apparatus 100 includes the guiding member 51 which permits mounting and dismounting of the mounting and dismounting unit 12, into which the belt unit 10 and the cleaning device 11 are integrally assembled, moved in the mounting and dismounting direction substantially perpendicular to the rotational axis direction of the first roller 10*h* and which guides the mounting and dismounting unit 12 during the mounting and dismounting of the mounting and dismounting unit 12 relative to the guiding member 51. Further, in the image forming apparatus 100, the first supporting member 42 is mounted on the second supporting member 43 so as to be swingable about the swing axis which is substantially parallel to the rotational axis direction of the first roller 10*h* and which is positioned in a position different from the rotational axis of the first roller 10*h*, the cleaning device 11 is fixed to the first supporting member 42 and is swingable together with the first supporting member 42, and the mounting and dismounting unit 12 is guided by the guiding member 51 so that the attitude of the mounting and dismounting unit 12 becomes the first attitude when the mounting of the mounting and dismounting unit 12 on the guiding member 51 is completed and becomes the second attitude such that when the mounting and dismounting unit 12 is mounted on and dismounted from the guiding member 51, a width (dimension) of the mounting and dismounting unit 12 with respect to a height direction (direction substantially perpendicular to the mounting and dismounting direction of the mounting and dismounting unit 12 as viewed along the rotational axis direction of the first roller 10*h* in this embodiment) is smaller than the width in the first attitude, so that the first supporting member 42 is swung. In this embodiment, the first supporting roller 10*h* is positioned on one end portion side of the mounting and dismounting unit 12 with respect to the mounting and dismounting direction, the second supporting roller 10*g* is positioned on the other end portion side with respect to the mounting and dismounting direction, and the mounting and dismounting unit 12 is mounted on the guiding member 51 from the first roller side. Further, in this embodiment, when the mounting and dismounting unit 12 in the first attitude is viewed along the rotational axis direction of the first roller 10*h*, the above-described swing axis is positioned on right(-hand) side of a rotational axis position of the first roller 10*h* toward a rotational axis position side of the second roller 10*g* with respect to the mounting and dismounting direction.

Further, in this embodiment, the guiding member 51 includes a first positioning portion 51*h* for positioning a first supporting member 42 when the mounting of the mounting and dismounting unit 12 on the guiding member 51 is completed and includes second positioning portions 51*g* and 51*i* for positioning a second supporting member 43 when the mounting of the mounting and dismounting unit 12 on the guiding member 51 is completed. Further, in this embodiment, the guiding member 51 includes a first guiding portion 51*f* for guiding the first supporting member 42 when the mounting and dismounting unit 12 is mounted on and dismounted from the guiding member 51 and a second guiding portion 51*e* for guiding the second supporting member 43 when the mounting and dismounting unit 12 is mounted on and dismounted from the guiding member 51. Further, in this embodiment, the image forming apparatus 100 includes a plurality of image bearing members 1 disposed side by side along the mounting and dismounting direction below the mounting and dismounting unit 12 mounted on the guiding member 51, and a lower-side end portion of the cleaning device 11 is positioned below a mounting and dismounting unit-side common contact flat plane H of the plurality of image bearing members 1 when the mounting and dismounting unit 12 is in the first attitude and is positioned above the common contact flat plane H when the mounting and dismounting unit 12 is in the second attitude. Further, in this embodiment, when the mounting and dismounting unit 12 in the first attitude is viewed along the rotational axis direction of the first roller 10*h*, the above-described swing axis is positioned between the rotational axis position of the first roller 10*h* and a rotational axis position of the image bearing member 1*a*, of the plurality of image bearing members 1, positioned closest to the first roller 10*h* along the common contact flat plane H.

As described above, in this embodiment, the belt cleaning device 11 is fixed to the swingable bearing member 42. For that reason, even when the bearing member 42 is swung during the mounting and dismounting of the intermediary transfer unit 12 relative to the apparatus main assembly 110, there is substantially no change in attitude between the belt cleaning device 11 and the tension roller 10*h*. By this, it is possible to suppress the influence of the swing on a positional relationship between the cleaning blade 11*e* of the belt cleaning device 11 and the intermediary transfer belt 10*e*. Accordingly, according to this embodiment, it is possible to realize space saving during the mounting and dismounting of the intermediary transfer unit 12 relative to the apparatus main assembly 110 while suppressing the change in relative positional relationship between the intermediary transfer belt 10*e* and the cleaning blade 11*e*.

Embodiment 2

Next, another embodiment of the present invention will be described. Basic constitutions and operations of an image forming apparatus in this embodiment are the same as those of the image forming apparatus in the embodiment 1. Accordingly, in the image forming apparatus in this embodiment, elements having the same or corresponding functions and constitutions as those in the image forming apparatus in the embodiment 1 are represented by the same reference numerals or symbols as those in the embodiment 1 and will be omitted from detailed description.

The intermediary transfer unit 12 in this embodiment is constituted so as to change the attitude thereof by the swing of the bearing member 42 similarly as the intermediary transfer unit 12 in the embodiment 1. In a maintenance operation or an exchange operation, the intermediary transfer unit 12 is placed on a flat surface in some cases in a state in which the intermediary transfer unit 12 is dismounted from the apparatus main assembly 110. In this case, in the constitution in which the intermediary transfer unit 12 changes the attitude thereof, there is a possibility that the surface (outer peripheral surface) of the intermediary transfer belt 10*e* contacts the flat surface and thus is damaged. This would be considered that the damage can be avoided by providing the frame 43 with a projected portion, for example. However, in that case, there is an increasing possibility that the intermediary transfer belt 10*e* is damaged by, for example, collision of the intermediary transfer belt 10*e* with the projected portion or catch of the intermediary transfer belt 10*e* by the projected portion during assembling of the intermediary transfer belt 10*e* with the frame 43 or during exchange of the intermediary transfer belt 10*e*.

FIG. 10 is a side view of the intermediary transfer unit 12 viewed from the front side along the rotational axis direction of the tension roller 10*h* in this embodiment in which the intermediary transfer unit 12 is dismounted from the apparatus main assembly 110 for the maintenance or the exchange. In this state, as described in the embodiment 1, the intermediary transfer unit 12 is in the all separation state, and the surface (primary transfer surface) of the intermediary transfer belt 10*e* is raised upward so as to be separated from the common contact flat plane H. Further, the bearing member 42 is not positioned by the guiding member 51, and therefore, is in a swingable state as indicated by a double-pointed arrow in FIG. 10.

FIG. 11 is a perspective view showing a shape of the bearing member 42 in this embodiment (showing only the bearing member 42 on the front side). The bearing member 42 includes a bearing portion-to-be-positioned 42*h* engageable with the guiding member 51 and a bearing foot portion 42*i* while sandwiching a slide swing engaging portion 42*j* with respect to the direction along the insertion and extraction direction of the intermediary transfer unit 12. Each of the bearing portion-to-be-positioned 42*h* and the bearing foot portion 42*i* is provided so as to project toward the common contact flat plane H side (downward) of the bearing member 42. Further, as shown in FIG. 10, the frame 43 includes a frame foot portion 43*m* at an end portion on a side opposite from an end portion on the bearing member 42 side with respect to the direction along the insertion and extraction direction of the intermediary transfer unit 12. The frame 43 in provided with, an each of opposite end portions with respect to the widthwise direction of the intermediary transfer belt 10*e*, a grip portion 43*p* operable by an operator during the mounting and dismounting of the intermediary transfer unit 12 so that the grip portion 43*p* projects toward a leading side of the pulling-out (extraction) direction of the intermediary transfer unit 12 than the driving roller 10*g* is. The frame foot portion 43*m* is provided so as to project toward the common contact flat plane H side (downward) at an end portion on a leading side of the pulling-out direction of the intermediary transfer unit 12.

FIG. 12 includes side views each showing the intermediary transfer unit 12, in this embodiment in a state in which the intermediary transfer unit 12 is dismounted from the apparatus main assembly 110 and is placed on a flat surface G, as viewed from the front side along the rotational axis direction of the tension roller 10*h*. Part (a) of FIG. 12 shows entirety of the intermediary transfer unit 12, and part (b) of FIG. 12 shows a neighborhood of all-separation the bearing member 42. As shown in FIG. 12, in the case where the intermediary transfer unit 12 is placed on the flat surface G, by a self-weight of the frame 43 and the like, the bearing member 42 is swung upward about the slide swing engaging portion 42*j* (swing axis 43*f*) relative to the frame 43. Then, not only the bearing foot portion 42*i* and a seating portion 11*g* of the belt cleaning device 11 are seated (grounded) on the flat surface G, but also the frame foot portion 43*m* is seated on the flat surface G, so that the intermediary transfer belt 10*e* is in a state in which the intermediary transfer belt 10*e* does not contact the flat surface G. In this state, the bearing foot portion 42*i*, the seating portion 11*g* of the belt cleaning device 11, and the frame foot portion 43*m* project toward the common contact flat plane H side (lower side) from the primary transfer surface of the intermediary transfer belt 10*e* in the all separation state. That is, in this state, the bearing foot portion 42*i*, the seating portion 11*g* of the belt cleaning device 11, and the frame foot portion 43*m* project outward from the outer peripheral surface of the intermediary transfer belt 10*e* in the all separation state.

Further, FIG. 13 includes side views each showing the belt unit 10, in this embodiment in a state in which the intermediary transfer unit 12 is dismounted from the apparatus main assembly 110 and then the belt cleaning device 11 is dismounted from the intermediary transfer unit 12 and the belt unit is placed on the flat surface G, as viewed from the front side along the rotational axis direction of the tension position 10*h*. Part (a) of FIG. 13 shows entirety of the belt unit 10, and part (b) of FIG. 3 shows a neighborhood of the bearing member 42. As shown in FIG. 13, in the case where there is no belt cleaning device 10, not only the bearing portion-to-be-positioned 42*h* and the bearing foot portion 42*i* are seated on the flat surface G, but also the frame foot portion 43*m* is seated on the flat surface G. By this, an effect similar to an effect in the case where the belt cleaning device 11 is present.

Further, as shown in FIG. 14, in the case where the intermediary transfer unit 12 is disposed inside the apparatus main assembly 110 in the all contact state, the bearing foot portion 42*i* has a shape such that the bearing foot portion 42*i* does not protrude toward the common contact flat plane H (lower side) from the primary transfer surface of the intermediary transfer belt 10*e*. That is, when the intermediary transfer unit 12 is mounted in the image forming apparatus 110 and the intermediary transfer belt 10*e* is rotationally driven, the bearing foot portion 42*i* is retracted inward from the outer peripheral surface of the intermediary transfer belt 10*e*. By employing such a constitution, the bearing foot portion 42*i* is configured so as not hinder the mounting and dismounting of the member of the image forming portion S, such as the photosensitive drum 1 (or the process cartridge 3) or the like.

Thus, in this embodiment, the first supporting member 42 includes a first seating portion 42*i* when the first supporting member 42 in the state in which the mounting and dismounting unit 12 is dismounted from the image forming apparatus 100 is swung in a direction from a position corresponding to the first attitude of the mounting and dismounting unit 12 toward a position corresponding to the second attitude of the mounting and dismounting unit 12. The cleaning device 11 includes a second seating portion 11*g* which projects outward from the outer peripheral surface of the image forming apparatus 100 and which is positioned on a side opposite from the first seating portion 42*i* while sandwiching the between the swing axis of the first supporting member 42 with respect to the mounting and dismounting direction of the mounting and dismounting unit 12 relative to the guiding member 51 when the first supporting member 42 in the state in which the mounting and dismounting unit 12 is dismounted from the image forming apparatus 100 is swung in the direction from the position corresponding to the first attitude of the mounting and dismounting unit toward the position corresponding to the second attitude of the mounting and dismounting unit 12. When the mounting and dismounting unit 12 is dismounted from the image forming apparatus 100 and then is placed on the flat surface G, the first seating portion 42*i* and the second seating portion 11*g* are seated on the flat surface G. Further, as a constitution in which the first supporting member 42 includes the first seating portion 42*i* and the second seating portion 42*h* positioned on a side opposite from the first seating portion 42*i* while sandwiching therebetween the swing axis with respect to the mounting and dismounting direction, which seating portions 42*i* and 42*h* project outward from the outer peripheral surface of the belt 10*e* when the first supporting member 42 in the state in which the mounting and dismounting unit 12 is dismounted from the image forming apparatus 100 is swung in the direction from the above-described position corresponding to the first attitude toward the above-described position corresponding to the second attitude, the first seating portion 42*i* and the second seating portion 42*h* may also be seated on the flat surface G when the mounting and dismounting unit 12 is dismounted from the image forming apparatus 100 and then the belt cleaning device 11 dismounted from the first supporting member 42 and is placed on the flat surface G. In this case, the second seating portion 42*h* may also constitute a portion-to-be-positioned which is positioned by the guiding member 51 when the mounting of the mounting and dismounting unit 12 on the guiding member 51 is completed. Further, in this embodiment the first seating portion 42*i* is retracted inward from the outer peripheral surface of the belt 10*e* when the mounting of the mounting and dismounting unit 12 on the guiding member 51 is completed and then the belt 10*e* is rotationally driven. Further, the second supporting member 43 may include a third seating portion 43*m* which projects outward from the outer peripheral surface of the belt 10*e* in a state in which the mounting and dismounting unit 12 is dismounted from the image forming apparatus 100 and which is seated on the flat surface when the mounting and dismounting unit 12 is placed on the flat surface.

As described above, according to this embodiment, not only an effect similar to the effect of the embodiment 1, but also it is possible to suppress damage of the surface of the intermediary transfer belt 10*e* in the case where the intermediary transfer unit 12 and the belt unit 10 which are dismounted from the apparatus main assembly 110 are placed on the flat surface.

Other Embodiments

As described above, the present invention was described based on specific embodiments, but the present invention is not limited to the above-described embodiments.

For example, in the above-described embodiments, the bearing portion-to-be-positioned 42*h* provided on the bearing member 42 was guided by the second guiding portion 51*f*. However, the portion-to-be-positioned provided on the bearing member 42 is not necessarily required to be used for placing the intermediary transfer unit 12 in the state of the second attitude. For example, by providing the belt cleaning device 11 with a guiding boss, it is also possible to restrict the attitude of the bearing member 42 (belt cleaning device 11) with use of this guiding boss in the state of the second attitude of the intermediary transfer unit 12. There is no problem when finally the position of the intermediary transfer unit 12 is determined by the portion-to-be-positioned provided on the bearing member 42 in a state in which the intermediary transfer unit 12 is mounted in the apparatus main assembly 110 and is placed in the first attitude. Thus, the guiding member 51 may include a first guiding portion for guiding the cleaning device 11 when the mounting and dismounting unit 12 is mounted on and dismounted from the guiding member 51 and may include a first positioning portion for positioning the first supporting member 42 when the mounting of the mounting and dismounting unit 12 on the guiding member 51 is completed. In this case, the cleaning device 11 may only be required to be separated from the first guiding portion when the mounting of the mounting and dismounting unit 12 on the guiding member 51 is completed and the first supporting member 42 is positioned by the first positioning portion. Further, in the above-described embodiments, the guiding member 51 is provided with the guiding portion for guiding the frame 43 and the guiding portion for guiding the bearing member 42, but it is also possible to constitute these guiding portions as a single guiding portion.

Further, in the above-described embodiments, the first supporting member (bearing member) supports only the roller to which the cleaning member is contacted via the belt, but the present invention is not limited to such an embodiment. The first supporting member may only be required to support at least the roller to which the cleaning member is contacted via the belt, and may also support another roller.

Further, in the above-described embodiments, the mounting and dismounting direction (or the common contact flat plane) of the mounting and dismounting unit relative to the apparatus main assembly (guiding member) was the substantially horizontal direction, but the present invention is not limited to such an embodiment, and the mounting and dismounting direction may be inclined with respect to the horizontal direction.

Further, in the above-described embodiments, the image forming apparatus employed the intermediary transfer type, but the present invention may also be applicable to an image forming apparatus of a direct transfer type. As is well known by the person ordinarily skilled in the art, a tandem(-type) image forming apparatus employing the direct transfer type includes a recording material carrying member constituted by an endless belt or the like instead of the intermediary transfer member in the above-described embodiments. Further, the toner images formed on the photosensitive members of the image forming portions are directly transferred onto the recording material carried and conveyed by the recording material carrying member similarly as the primary transfer in the image forming apparatus of the intermediary transfer type. Even in such an image forming apparatus, by applying the present invention in conformity to the above-described embodiments, an effect similar to the effects of the above-described embodiments can be obtained.

Further, the inconveniences caused due to the change in relative positional relationship between the belt and the cleaning member become conspicuous in a constitution in which the cleaning blade as the cleaning member is contacted to the belt. This is due to that the cleaning blade is moved so as to bite into the belt and is liable to be broken, or the like. However, the present invention is applicable to a constitution in which a cleaning member in any form for which inconveniences such as breakage of the cleaning member, leakage of the toner, and improper cleaning caused due to the change in relative positional relationship between the belt and the cleaning member is used. As the cleaning member, other than the blade-like member, it is possible to cite a fixedly provided blade-like member, a rotatable brush-like member, a sheet (film)-like member, and the like.

According to the present invention, it is possible to realize the space saving during the mounting and dismounting of the mounting and dismounting unit relative to the apparatus main assembly of the image forming apparatus while suppressing the change in relative positional relationship between the belt and the cleaning member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-172045 filed on Oct. 20, 2021, which is hereby incorporated by reference herein in its entirety.

What is claimed is:

1. An image forming apparatus comprising:

an image forming portion configured to form a toner image; and a belt unit including a belt onto which the toner image is transferred, a stretching roller configured to stretch the belt, a frame configured to support the stretching roller, a cleaning unit provided with a blade for cleaning the belt in contact with the belt, an opposing roller opposing the blade through the belt, and a swinging member configured to support the cleaning unit and to be swingable about the frame, wherein the belt unit is detachably mountable in a direction crossing to a rotational axis direction of the stretching roller, and wherein the swinging member holds the opposing roller and a swing center of the swinging member is provided in a position different from a rotation center of the opposing roller.

2. An image forming apparatus according to claim 1, wherein the image forming portion includes a first image bearing member configured to bear the toner image and a second image bearing member configured to bear the toner image, wherein the first image bearing member and the second image bearing member are arranged in parallel in a predetermined direction, and wherein the belt unit is detachably mounted in a direction along the predetermined direction.

3. An image forming apparatus according to claim 2, wherein the predetermined direction is a direction along a horizontal direction.

4. An image forming apparatus according to claim 1, wherein the swinging member is swingably provided about a swing axis along the rotational axis direction of the stretching roller.

5. An image forming apparatus according to claim 1, further comprising a guiding portion configured to guide the belt unit when the belt unit is mounted and dismounted, wherein the belt unit is constituted so that the swinging member is positioned in a first swing position when the belt unit is positioned in a mounting position and so that the swinging member is swung to a second swing position from the first swing position by being guided by the guiding portion when the belt unit is dismounted from the mounted position, and wherein when the swinging member is positioned in the first swing position, a width of the belt unit with respect to a height direction perpendicular to a mounting and dismounting direction of the belt unit is a first width, and when the swinging member is positioned in the second swing position, a width of the belt unit with respect to the height direction is a second width smaller than the first width.

6. An image forming apparatus according to claim 1, wherein the swing center of the swinging member is positioned between the rotation center the opposing roller and the stretching roller with respect a direction toward a rotation center of the stretching roller from the rotation center of the opposing roller.

7. An image forming apparatus according to claim 1, wherein the swing center of the swinging member is located downstream of the rotation center of the opposing roller and upstream of a position where the toner image is transferred to the belt.

8. An image forming apparatus according to claim 5, wherein the swinging member is provided with a foot portion so as to project outward from an outer peripheral surface of the belt when the swinging member is swung in a direction from a position corresponding to the first swing position to a position corresponding to the second swing position, and wherein when the belt unit is dismounted and the belt unit is located in a flat surface, the belt unit is constituted so that the belt does not contact the flat surface by the foot portion being seated on the flat surface.

9. A belt unit comprising:

a belt onto which a toner image is transferred;

a stretching roller configured to stretch the belt;

a frame configured to rotatably support the stretching roller;

a cleaning unit provided with a blade for cleaning the belt in contact with the belt;

an opposing roller opposing the blade through the belt; and a swinging member configured to support the cleaning unit and to swing the cleaning unit to the frame, wherein the swinging member holds the opposing roller and of which a swing center is provided in a position different from a rotation center of the opposing roller.

10. An image forming apparatus according to claim 9, wherein the swinging member is swingably provided about a swing axis along a rotational axis direction of the stretching roller.

11. An image forming apparatus according to claim 9, wherein the swing center of the swinging member is located downstream of the rotation center of the opposing roller and upstream of a position where the toner image is transferred to the belt.

* * * * *